(12) United States Patent
Bessho

(10) Patent No.: US 7,895,989 B2
(45) Date of Patent: Mar. 1, 2011

(54) BUTTERFLY-TYPE THROTTLE VALVE

(75) Inventor: Takashi Bessho, Obu (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 205 days.

(21) Appl. No.: 12/281,644

(22) PCT Filed: Jan. 9, 2007

(86) PCT No.: PCT/JP2007/050064
§ 371 (c)(1),
(2), (4) Date: Sep. 4, 2008

(87) PCT Pub. No.: WO2007/108220
PCT Pub. Date: Sep. 27, 2007

(65) Prior Publication Data
US 2009/0050106 A1    Feb. 26, 2009

(30) Foreign Application Priority Data
Mar. 15, 2006   (JP) ................. 2006-070774

(51) Int. Cl.
*F02D 9/10* (2006.01)
(52) U.S. Cl. ........ 123/337; 123/399; 251/305; 29/888.45
(58) Field of Classification Search ............ 123/337, 123/399; 251/305, 306, 308; 29/888.45, 29/888.451, 888.452, 890.124, 890.125
See application file for complete search history.

(56) References Cited

U.S. PATENT DOCUMENTS

| | | | | |
|---|---|---|---|---|
| 2,105,343 A | * | 1/1938 | Briggs | 251/308 |
| 4,003,394 A | * | 1/1977 | Adams | 137/15.06 |
| 4,325,536 A | * | 4/1982 | Garrett | 251/308 |
| 4,335,738 A | * | 6/1982 | Nassir | 137/246.22 |
| 5,666,988 A | * | 9/1997 | Becker | 137/15.18 |
| 6,589,380 B2 | * | 7/2003 | Gnage et al. | 156/272.8 |
| 6,901,942 B2 | * | 6/2005 | Krimmer et al. | 137/15.25 |
| 2006/0208212 A1 | | 9/2006 | Hannewald | |

FOREIGN PATENT DOCUMENTS

| | | |
|---|---|---|
| DE | 10240910 | 3/2004 |
| EP | 1534946 | 6/2005 |
| JP | 462633 | 1/1971 |
| JP | 62230443 | 10/1987 |
| JP | 11-072030 A | 3/1993 |
| JP | 534363 | 5/1993 |
| JP | 2002364387 | 12/2002 |
| JP | 2004251235 | 9/2004 |
| JP | 2005537435 | 12/2005 |
| JP | 2007032285 | 2/2007 |
| WO | 2004025104 | 3/2004 |

* cited by examiner

*Primary Examiner* — Erick Solis
(74) *Attorney, Agent, or Firm* — Dennison, Schultz & Macdonald

(57) ABSTRACT

A butterfly valve-type throttle valve 10 includes a valve shaft 12 extending across an intake air passage 5 of an internal combustion engine, and a butterfly-type valve body 14 for adjusting a flow rate of an intake air flowing through the intake air passage 5 by rotating in unison with the valve shaft 12. The valve body 14 is constituted by two split members 20, and is configured such that the split members 20 are coupled to each other by a welding 36, which is a coupling that uses no screw, and such that an axial hole 34 for fitting with the valve shaft 12 is formed through the coupling. A gap closing member 16 is provided on a circumferential edge portion of the valve body 14 for closing a gap between the valve body 14 positioned at a fully closed position and a passage wall surface 5*a* of the intake air passage 5.

14 Claims, 17 Drawing Sheets

BUTTERFLY-TYPE THROTTLE VALVE

TECHNICAL FIELD

The present invention relates to a butterfly valve-type throttle valve. In particular, the present invention relates to a butterfly valve-type throttle valve in an internal combustion engine, which is used as a throttle valve of an intake air control device, a variable intake-air valve for changing a substantive length of an intake air pipe within a surge tank, and a swirl control valve or a tumble control valve for producing swirls in the flow of intake air.

BACKGROUND ART

A butterfly valve-type throttle valve includes a valve shaft extending across an intake air passage of an internal combustion engine, and a butterfly valve-type valve body that rotates in unison with the valve shaft for controlling the flow rate of the intake air that flows through the intake air passage. As a prior art butterfly valve-type throttle valve, there has been a throttle valve in which an elongated hole is formed in a valve shaft to extend therethrough in a diametrical direction, a valve body is inserted into the elongated hoe, and a vis is inserted in a direction intersecting with the elongated hole in order to fix the valve body to the valve shaft (for example, see Patent Document 1, etc.)

Patent Document 1: Japanese Laid-Open Patent Publication No. 2002-364387

With the aforementioned prior art butterfly valve-type throttle valve (for example, see Patent Document 1), vises so-called "screws" are used for fixing the valve body to the valve shaft. Therefore, there has been a risk of loosening of the screws and of shakiness of the valve body and removal of the screws due to the loosening of the screws, and hence, there has been a problem that the reliability in fixing the valve body to the valve shaft is low.

Thus, there is a need in the art for a butterfly valve-type throttle valve that can improve the reliability in fixing a valve body to a valve shaft.

SUMMARY OF THE INVENTION a first aspect of the present invention, includes a butterfly-type throttle valve that can adjust a flow rate of intake air flowing through an intake air passage by the rotation of a butterfly valve-type valve body in unison with a valve shaft. And it is constituted such that a plurality of split members constituting the valve body are coupled to each other by coupling means, which uses no screw, and that an axial hole for fitting with the valve shaft is defined through the coupling of the plurality of split members. Therefore, it is possible to solve the problem caused by the screws in the prior art butterfly valve-type throttle valve (for example, see Patent Document 1) and to improve the reliability in fixing the valve body to the valve shaft.

With a butterfly valve-type throttle valve according to a second aspect of the present invention, a gap closing member provided on a circumferential edge portion of the valve body closes a gap between the valve body in a fully closed position and a passage wall surface of the intake air passage, and therefore, it is possible to reduce an amount of leakage of flow of the intake air when in the fully closed position.

And, a butterfly valve-type throttle valve according to a third aspect of the present invention is configured such that a circumferential edge groove portion for fitting with the gap closing member is defined through coupling between the plurality of split members that constitute the valve body. Therefore, it is possible to easily from the circumferential edge groove portion for fitting with the gap closing member by the coupling between the plurality of split members.

And, with a butterfly valve-type throttle valve according to a fourth aspect of the invention, it is possible to ensure that the valve shaft and the valve body are prevented from rotation about the axis relative to each other due to engagement by engaging means provided between the valve shaft and the axial bore of the valve body.

And, with a butterfly valve-type throttle valve according to a fifth aspect of the present invention, the plurality of split members are made of resin, so that it is possible to reduce the weight of the valve body and to improve the durability against vibrations of the butterfly valve-type throttle valve. In addition, with the valve body constituted by the plurality of resin split members, it is possible to eliminate machining operations that are necessary in the case of a metal valve body.

And, with a butterfly valve-type throttle valve according to a sixth aspect of the present invention, the plurality of split members made of resin are coupled to each other by welding means, so that it is possible to easily couple the split members to each other.

With the butterfly valve-type throttle valve according to the present invention, it is possible to solve the problem caused by the screws in the prior art butterfly valve-type throttle valve (for example, see Patent Document 1) and to improve the reliability in fixing the valve body to the valve shaft

Figure 1:
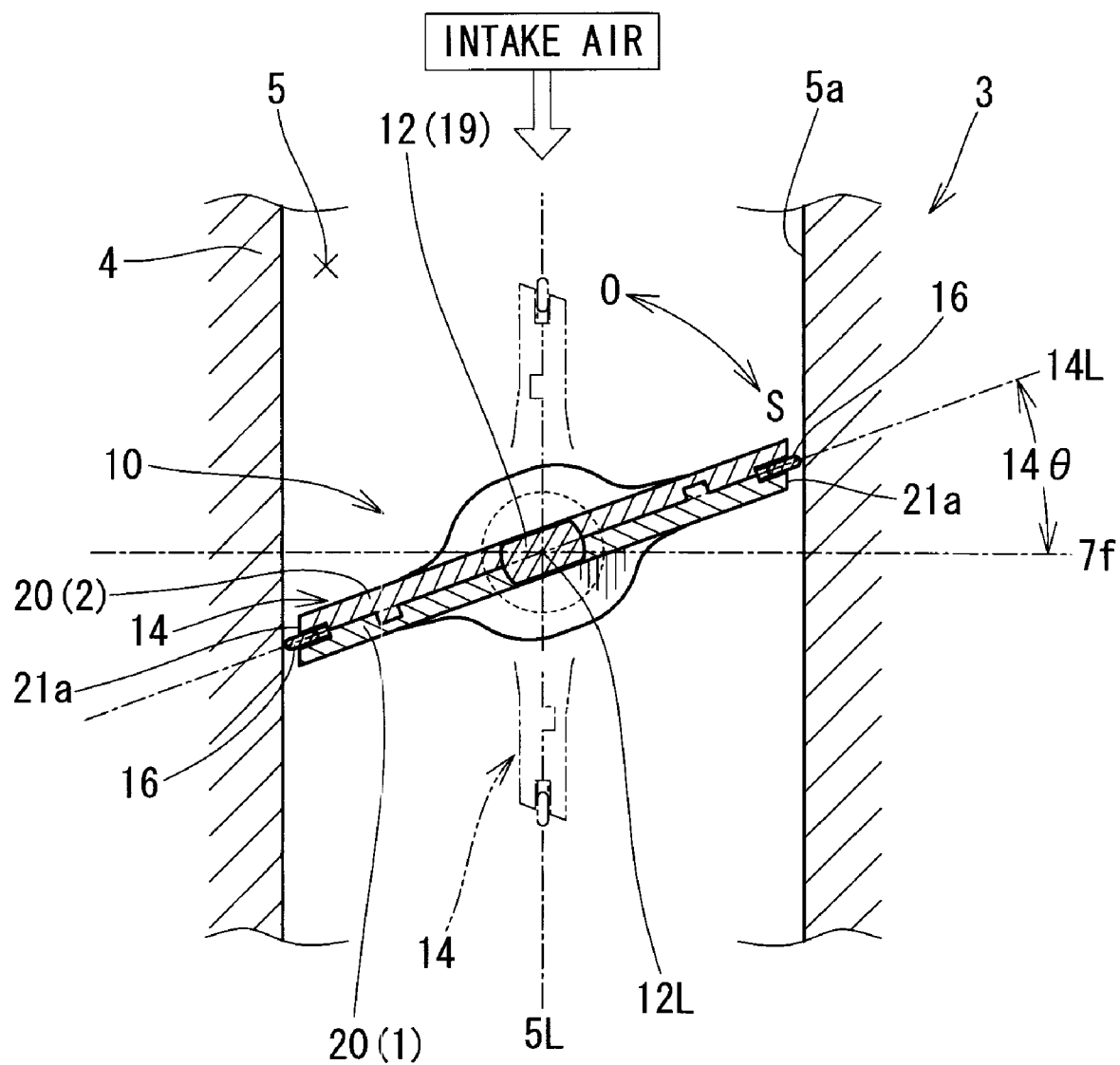
[FIG. 1] This is a side sectional view of a butterfly valve-type throttle valve provided on a variable intake air valve device according to Embodiment 1 of the present invention.

DESCRIPTION OF NUMERALS 3 variable intake air valve device
4 intake air passage defining member
5 intake air passage
5a a passage wall surface
10 butterfly valve-type throttle valve
12 valve shaft
14 valve body
16 gap closing member
20 split member
34 axial bore
36 welding means (coupling means that uses no screw)
50 axial bore
58 axial bore

DETAILED DESCRIPTION OF THE INVENTION

Embodiments

Embodiment 1

Embodiment 1 of the present invention will be described with reference to the drawings. A butterfly valve-type throttle valve of this embodiment is used for a multiple-type variable intake air valve device 3. FIG. 1 shows a side sectional view of the butterfly valve-type throttle valve provided on the variable intake air valve device.

As shown in FIG. 1, a multiple-type variable intake air valve device 3 has a butterfly valve-type throttle valve 10 provided within an intake air passage defining member 4, such as a valve body and a valve housing and capable of opening and closing. A cylindrical intake air passage (hereinafter also called "bore") 5 communicating with an internal combustion engine is defined within the intake air passage defining member 4.

The butterfly valve-type throttle valve 10 is provided with a valve shaft 12 and a valve body 14 as its primary components. The valve shaft 12 is rotatably supported on the intake air passage defining member 4 so as to extend across the intake air passage 5. The valve body 14 is of a disk-shaped butterfly valve-type, disposed on the valve shaft 12 and adjusts the flow rate of the intake air flowing through the intake air passage defining member 4 by rotating in unison with the valve shaft 12. In FIG. 1, assuming that the upper side is the upstream-side of the intake air passage 5 and that the lower side is the upstream side of the intake air passage 5, the intake air flowing towards the internal combustion engine flows from the upstream side to the downstream side through the intake air passage 5. In the case of the multiple-type variable intake air valve device 3, the valve shaft 12 extends across a plurality of intake air passages 5 that are defined in parallel with each other within the intake air passage defining member 4, and a plurality of valve bodies 14 are disposed on the valve shaft 12 to correspond to the respective intake air passages 5.

In this embodiment, a fully closed position (see solid lines 14 in FIG. 1) of the valve body 14 is set to a position where a central line (central plane) 14L of the valve body 14 extending through an axis 12L of the valve shaft 12 intersects with or incline by a predetermined set angle of 14θ relative to a plane 7f that is perpendicular to an axis 5L of the intake air passage 5 and includes the axis 12L of the valve shaft 12. The intake air passage 5 is opened as the valve body 14 rotates in an open direction (see an arrow O in FIG. 1) from the fully closed position, and a fully opened position of the valve body 14 is set to be a position (see two-dot chain lines 14 in FIG. 1) where the central line (central plane) 14L of the valve body 14 overlaps with the axis 5L of the intake air passage 5. The intake air passage 5 is closed as the valve body 14 is rotated in a closing direction (see arrow S in FIG. 1) from the fully opened position.

Although not show in the drawings, the valve shaft 12 is coupled to an output shaft of an actuator (such as an electric motor) via an interlock mechanism, such as a link mechanism, etc. The electric motor is drive-controlled by a control circuit (so-called ECU) based on the stepping amount of an accelerator pedal, the operating condition of the engine, etc. And, as the electric motor is driven, the valve shaft 12 is rotated via the interlock mechanism, and in conjunction with this, the degree of opening of the valve body 14 is controlled to adjust the amount of flow of the intake air flowing through the intake air passage 5.

Figure 2:
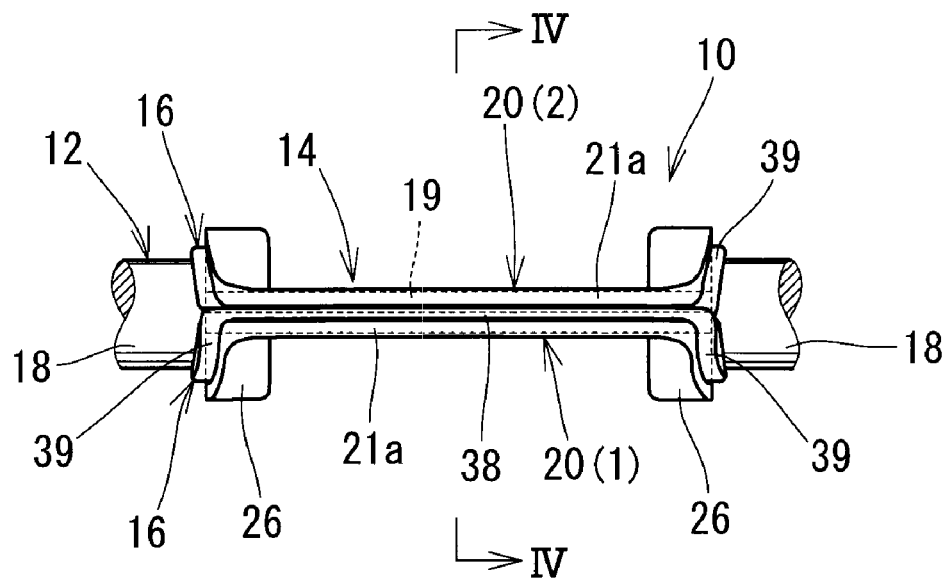
[FIG. 2] This is a front view showing the butterfly valve-type throttle valve.
Figure 3:
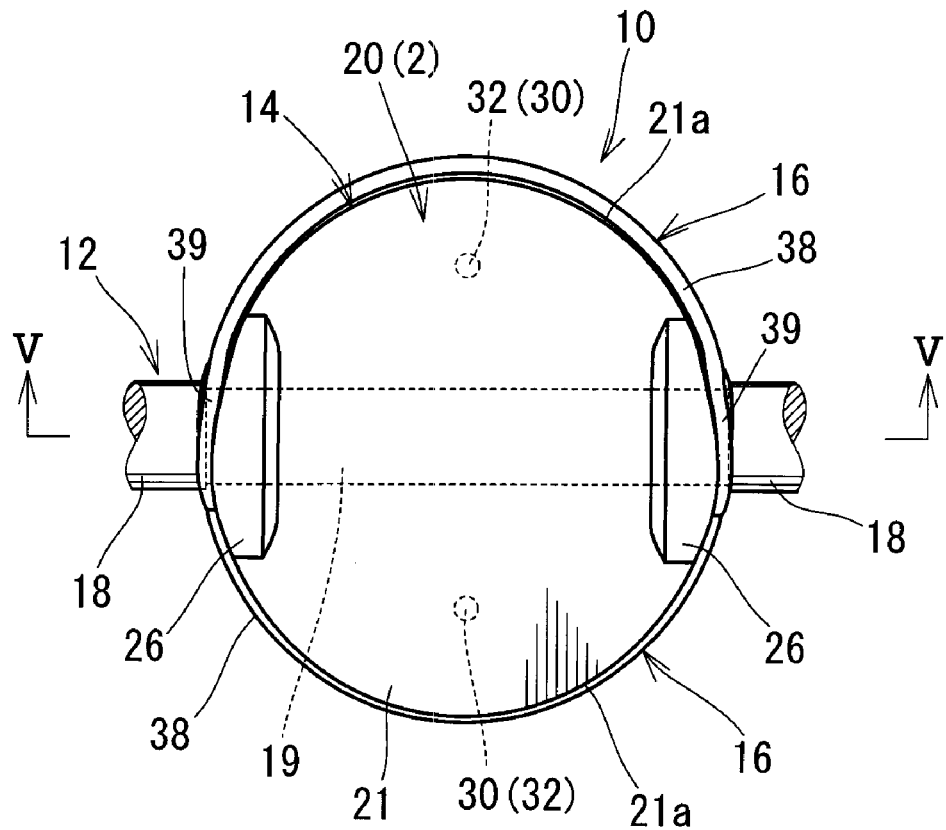
[FIG. 3] This is a plan view showing the butterfly valve-type throttle valve.
Figure 4:
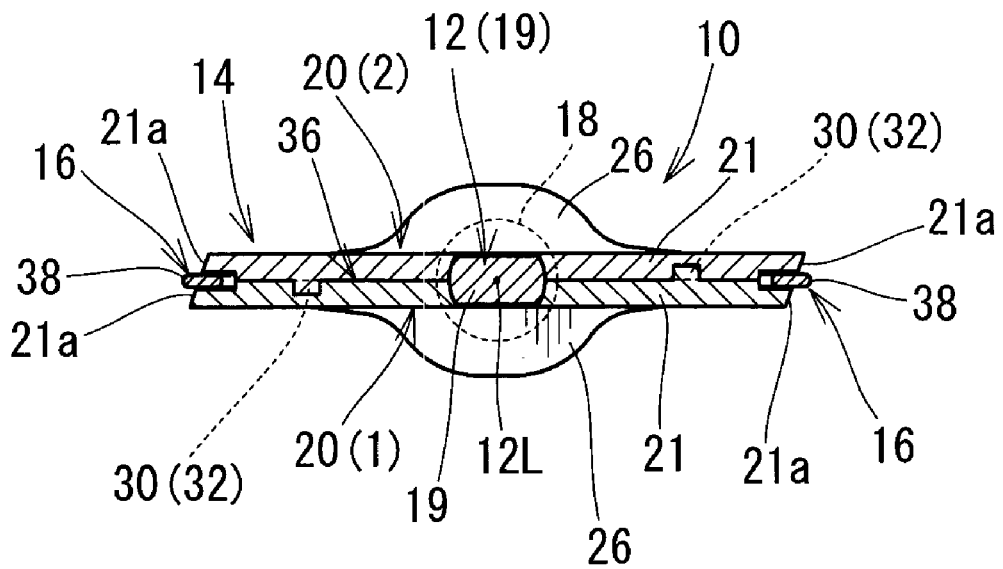
[FIG. 4] This is a cross sectional view taken along line IV-IV in FIG. 2.
Figure 5:
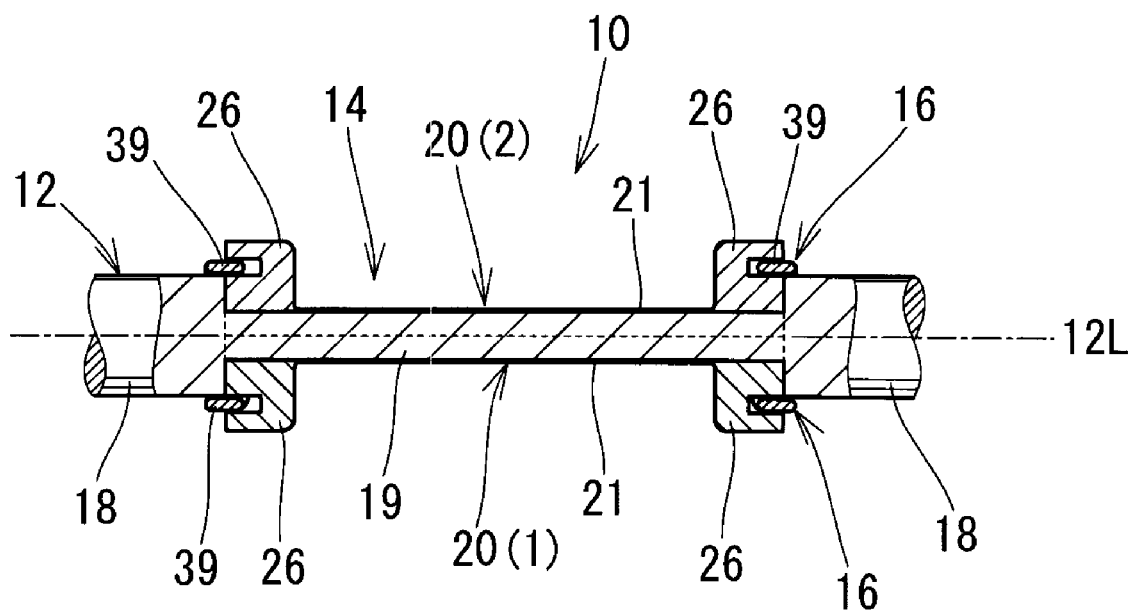
[FIG. 5] This is a cross sectional view taken along line V-V in FIG. 3.
Figure 6:
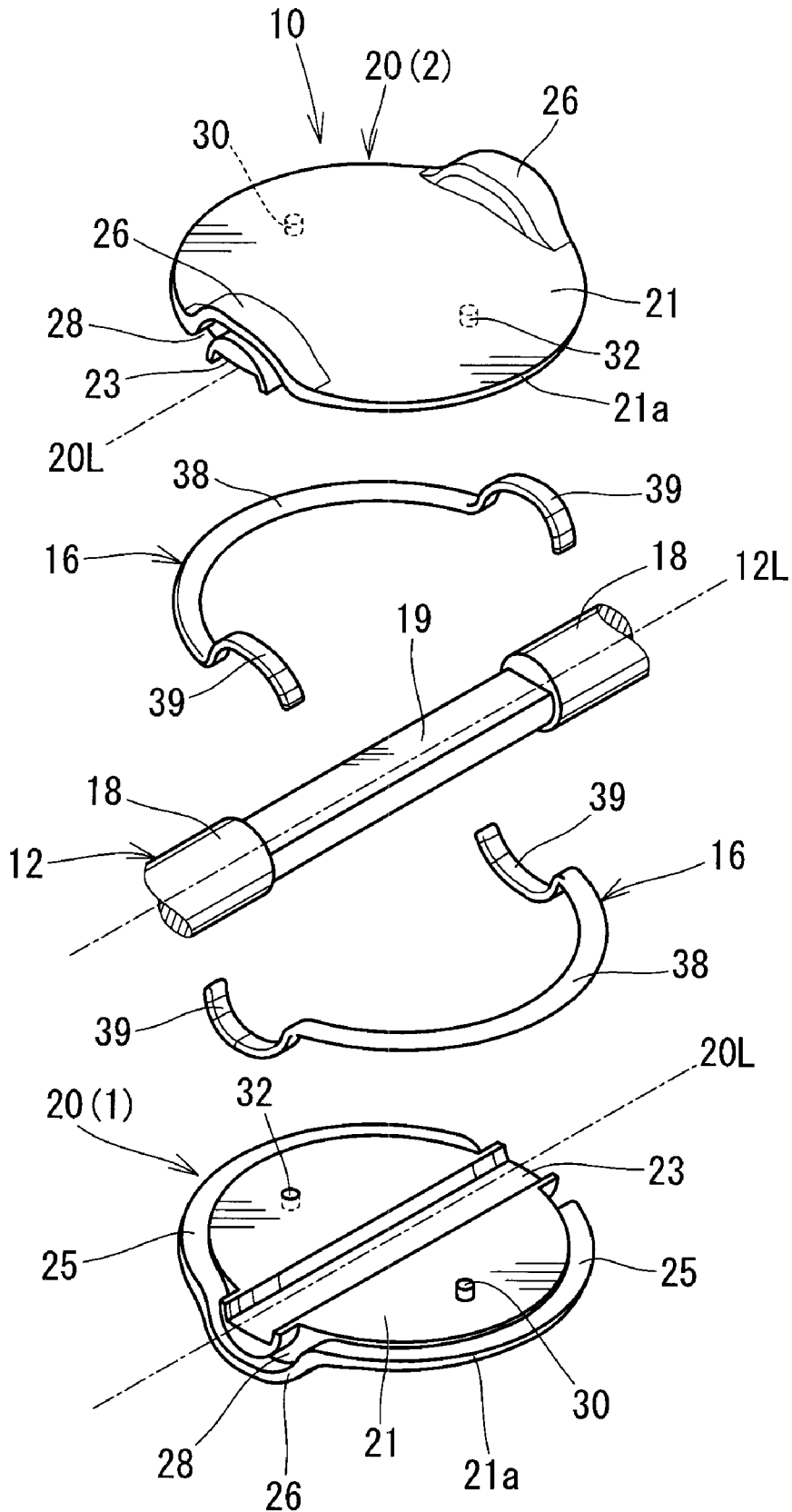
[FIG. 6] This is a perspective view showing components of the butterfly valve-type throttle valve in an exploded form.
Figure 7:
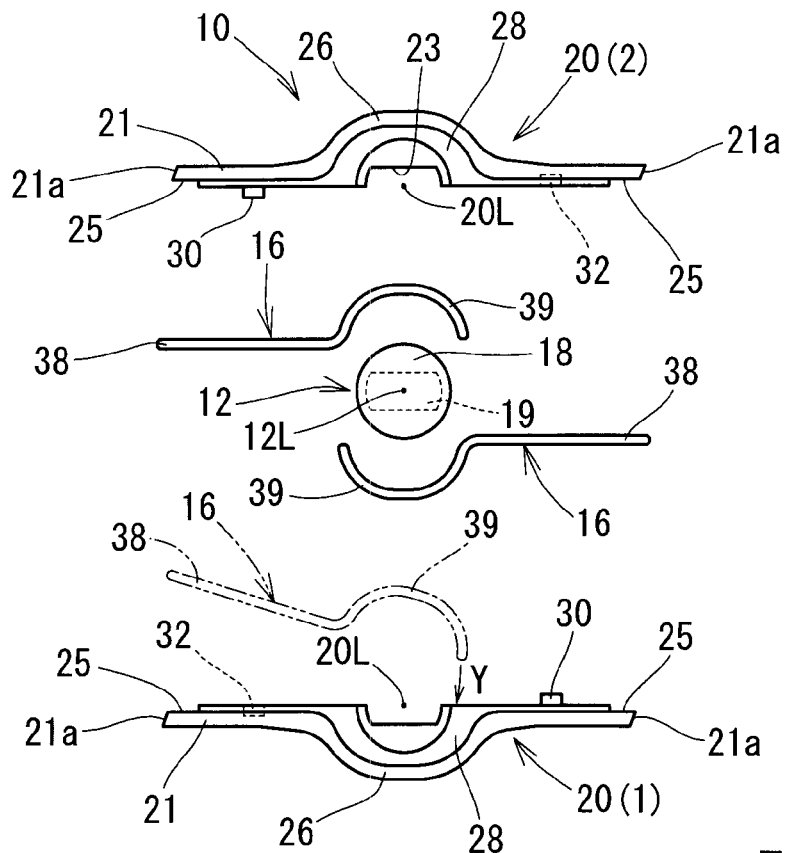
[FIG. 7] This is a side view showing the components of the butterfly valve-type throttle valve in an exploded form.
Figure 8:
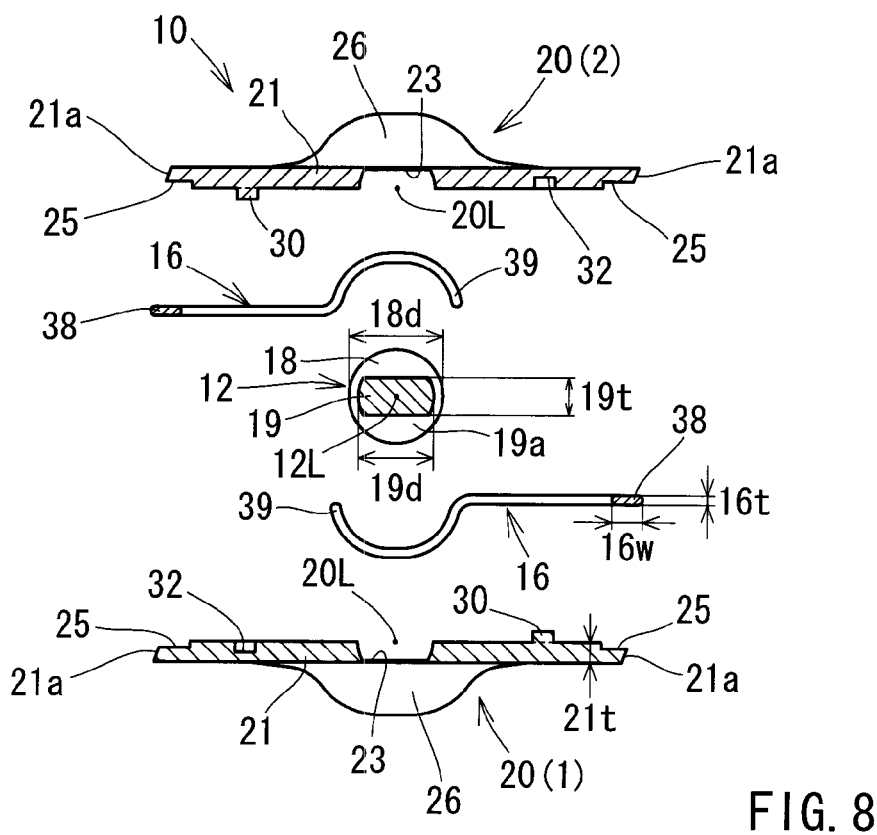
[FIG. 8] This is a side sectional view showing the components of the butterfly valve-type throttle valve in an exploded form.

Next, the butterfly valve-type throttle valve 10 will be described in detail. FIG. 2 is a front view showing the butterfly valve-type throttle valve 10, FIG. 3 is a plan view of the same, FIG. 4 is a cross sectional view taken along line IV-IV in FIG. 2, and FIG. 5 is a cross sectional view taken along line V-V in FIG. 3. And, FIG. 6 is a perspective view showing components of the butterfly valve-type throttle valve 10 in an exploded form, FIG. 7 is a side view of the same, and FIG. 8 is a side sectional view of the same.

As shown in FIGS. 2 to 5, in addition to the valve shaft 12 and the valve body 14, the butterfly valve-type throttle valve 10 has gap closing members 16 as the primary components. The valve shaft 12, the valve body 14 and the gap closing members 16 will be described in this order.

The valve shaft 12 is first described. As shown in FIG. 6, the valve shaft 12 is made, for example, of metal, and includes on the same axis 12L support shaft portions 18 rotatably supported by the intake air passage defining member 4 (see FIG. 1) and a fitting shaft portion 19 for fitting with the valve body 14. The support shaft portions 18 positioned next to each other with the intervention of the fitting shaft portion 19 are each formed to have a round rod-like configuration having a circular cross section. In addition, as shown in FIG. 8, the fitting shaft portion 19 has a shaft diameter 19d smaller than a shaft diameter 18d of the support shaft portions 18 and has a two-face width configuration with parallel flat surfaces 19a.

Next, the valve body 14 will be described. As shown in FIGS. 3 to 5, the valve body 14 has a configuration like a circular plate and is supported on the fitting shaft portion 19 of the valve shaft 12 by a fitting operation. The valve body 14 is constituted by a combination of two split members 20 that are divided into two parts with respect to the thickness of the valve body 14. Thus, the two split members 20 are configured such that they can be fitted on the fitting shaft portion 19 of the valve shaft 12 in a diametrical direction, in particular a two-face width direction (vertical direction in FIGS. 4 and 5), and are joined to each other with the intervention of the valve shaft 12 to form a single valve body 14 that rotates in unison with the valve shaft 12. For the purpose of explanation, (1) is affixed to the numeral of the lower split member 20, and (2) is affixed to the numeral of the upper split member 20.

Because the two split members 20(1) and 20(2) are formed of the same components, the split member 20(1) on one side (on the downward side in the drawings) will be described. As shown in FIG. 6, the split member 20(1) is made, for example, of resin and is formed primarily of a substantially circular plate-like main plate portion 21. As shown in FIG. 8, the main plate portion 21 is formed to have a thickness 21t that is slightly larger than half of a thickness 19t in the two-face width direction of the fitting shaft portion 19 of the valve shaft 12. A reference line corresponding to the center for overlapping of the split members 20(1) and 20(2) will be hereinafter called an overlapping central line 20L. The overlapping central line 20L also is the central line for rotation of the valve body 14 and aligns with the axis 12L of the valve shaft 12.

Figure 9:
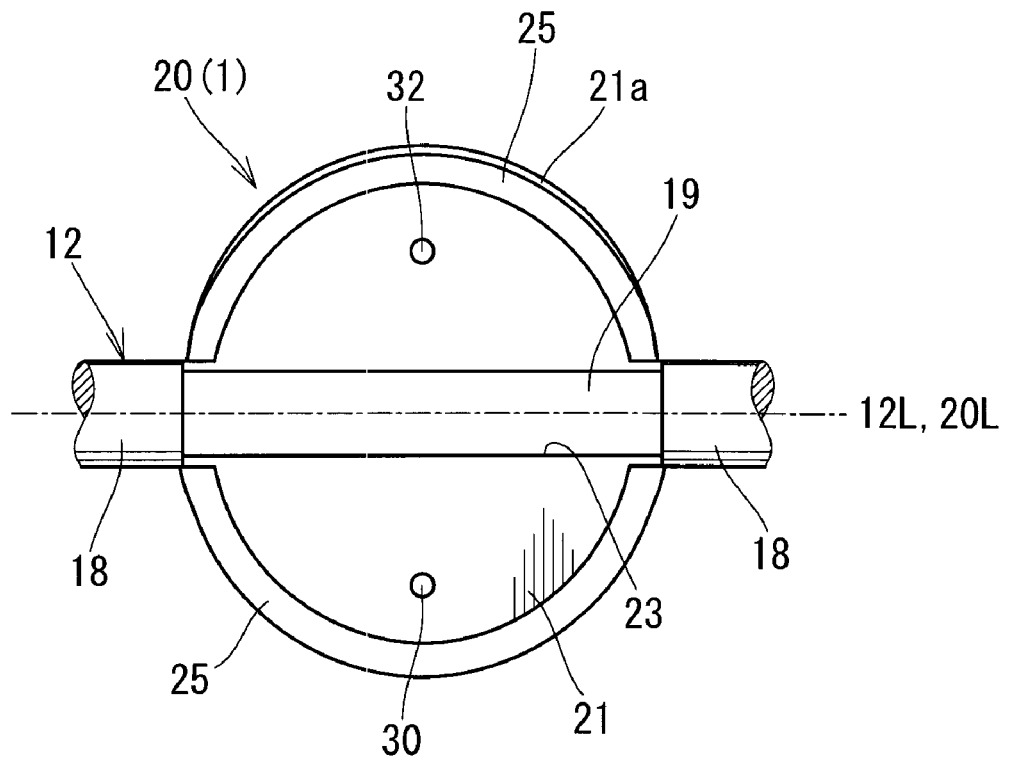
[FIG. 9] This is a plan view showing the fitting relation between split members and a valve shaft.

As shown in FIG. 6, an axial groove 23 is formed in the upper surface (back surface) of the main plate portion 21 and extends linearly in a diametrical direction along the overlapping central line 20L. The axial groove 23 is formed to be able to be fitted with the lower half part of the fitting shaft portion 19 of the valve shaft 12 from the lower side. FIG. 9 is a plan view showing the fitting relation between the split members 20 and the valve shaft 12.

Further, as shown in FIGS. 7 and 8, a circumferential end surface 21a of the main plate portion 21 is configured as an inclined surface that extends parallel to a passage wall surface 5a of the intake air passage 5 (see FIG. 1) when the valve body 14 is in the fully closed position. At a position proximal to the overlapping central line 20L, the circumferential end surface 21a is divided into two parts with a pair of boss portions 26 (that will be explained later) positioned therebetween and smoothly continues with outer end surfaces of the boss portions 26.

Further, a pair of circumferential groove portions 25 configured like stepped grooves opening at the circumferential end surface 21a are formed in the peripheral edge portion of the upper surface (back surface) of the main plate portion 21 in line-symmetric about the overlapping central line 20L (see FIG. 6).

As shown in FIG. 7, the pair of boss portions 26 are formed integrally with the lower surface (front surface) of the main plate portion 21 and have semi-circular configurations to extend about opposite ends of the of the axial groove 23. Groove portions 28 extending in a direction about an axis and each having a semi-circular configuration about the overlapping central line 20L are formed in the outer end faces of the boss portions 26. The circumferential grooves portions 25 and the respective groove portions 28 extending in the direction about the axis extend in series with each other in the circumferential direction.

A positioning projection 30 and a positioning recess portion 32 are formed on the upper surface (back surface) of the main plate portion 21 at positions in line-symmetrical with respect to the overlapping central line 20L (see FIG. 6). The positioning projection 30 may, for example, projects in a manner like a cylindrical projection. The positioning recess portion 32 is recessed to have a hollow cylindrical configuration to correspond to the positioning projection 30.

A process of constituting the valve body 14 by assembling the one split member 20(1) on the other split member 20(2) formed of the same component as the spring member 20(1) will now be described.

First, the fitting shaft portion 19 is fitted into the axial groove 23 of the one split member 20(1) from the upper side relative thereto (see FIG. 9). At that moment, the lower half of the fitting shaft portion 19 is fitted into the axial groove 23 and the upper half thereof protrudes upward from the upper surface (back surface) of the split member 20(1). In addition, the overlapping central line 20L of the split member 20(1) aligns with the axis 12L of the valve shaft 12.

Next, the other split member 20(2) is brought to mate with the one split member 20(1). At this moment, the back surface of the other split member 20(2) is positioned to oppose to the upper surface (back surface) of the one split member 20(1) in back-to-back relation therewith and is positioned to be offset therefrom in phase by 180°. Then, the positioning recess portion 32 of the other split member 20(2) is positioned to oppose to the positioning projection 30 of the one split member 20(1), and the positioning projection 30 of the other split member 20(2) is positioned to oppose to the positioning recess portion 32 of the one split member 20(1) (see FIGS. 6 to 8).

Figure 10:
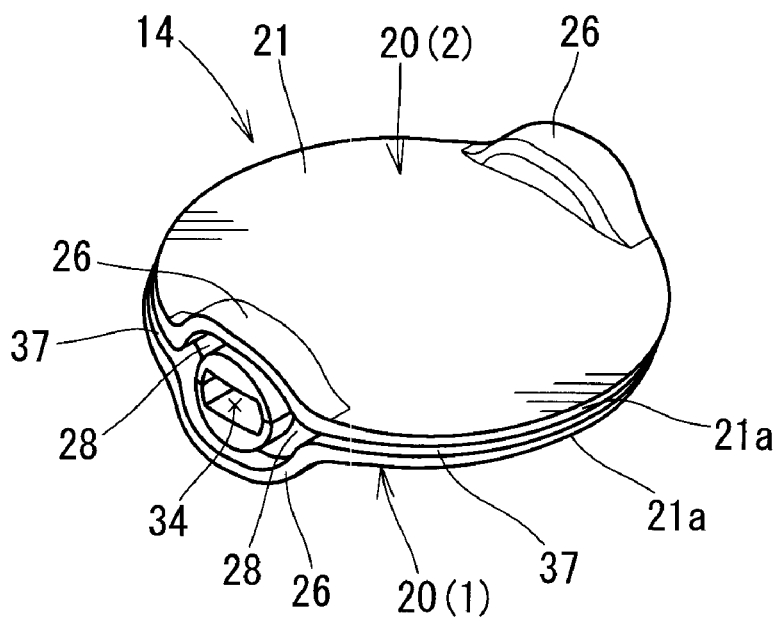
[FIG. 10] This is a perspective view showing the valve body.
Figure 11:
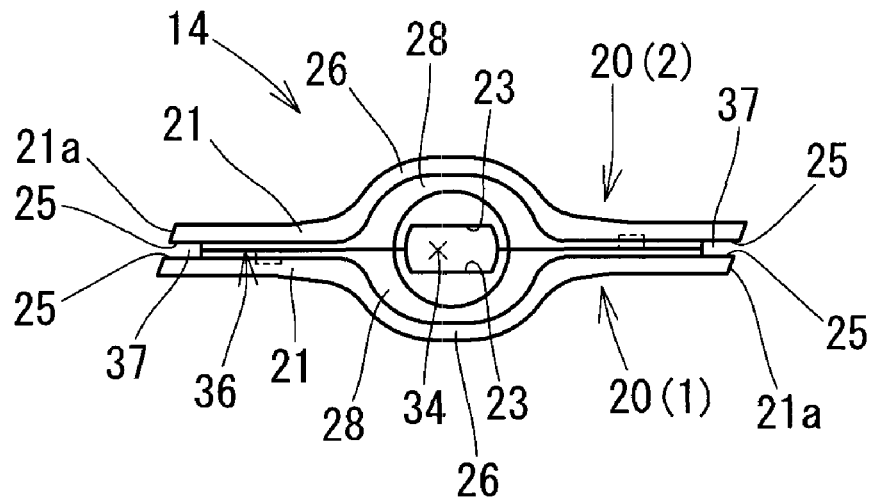
[FIG. 11] This is a side view showing the valve body.

In this state, the upper surface (back surface) of the other split member 20(2) is brought to overlap with the lower surface (back surface) of the one split member 20(1) in surface-to-surface contact relation therewith. Then, the axial groove 23 of the other split member 20(2) is fitted with the upper half of the fitting shaft portion 19 of the valve shaft 12, so that an axial bore 34 (see FIGS. 10 and 11) fitting with the fitting shaft portion 19 of the valve shaft 12 is defined by the axial grooves 23 of the split members 20. FIG. 10 is a perspective view of the valve body, and FIG. 11 is a side view of the same.

Through fitting or engagement between the fitting shaft portion 12 and the axial bore 34 of split members 20, the valve body 14 is fixed to the valve shaft 12 not to rotate in a direction about the axis, and is positioned with respect to an axial direction (see FIGS. 4 and 5). The fitting shaft portion 19 having the two-face width configuration of the valve shaft 12 and the axial bore 34 fitting therewith constitute "engaging means" referred to in this description.

Further, the positioning recess portion 32 and the positioning projection 30 of the other split member 20(2) are fitted with the positioning projection 30 and the positioning recess portion 32 of the one split member 20(1), respectively (see FIG. 4). Therefore, the split members 20 are positioned relative to each other (see FIG. 4). The positioning projection 30 and the positioning recess portion 32 constitute "positioning means" referred to in this description.

As described above, the valve body 14 (see FIGS. 10 and 11) is constituted through coupling between the main plate portions 21 of the split members 20(1) and 20(2) in such a manner that they overlap with each other, by means of coupling means that utilizes no screw (see FIGS. 2 to 5). In this embodiment, welding means (to which reference numeral 36 is affixed), such as vibration welding means, hot-plate welding means, laser welding means, etc. is used as coupling means for the split members 20(1) and 20(2) that are made of resin (see FIGS. 5 and 11).

Further, it is possible to easily assemble the butterfly valve-type throttle valve 10 with the intake air passage defining member 4 if the valve shaft 12 is rotatably supported on the intake air passage defining member 4 (see FIG. 1) prior to coupling between the split members 20(1) and 20(2), and the split members 20(1) and 20(2) are thereafter coupled to each other with the valve shaft 12 interleaved therebetween within each of the intake air passages 5 of the intake air passage defining member 4.

Furthermore, it is possible to mold the intake air passage defining member 4 by resin with the butterfly valve-type throttle valve 10 inserted.

In the case of the multiple-type variable intake air valve device 3, it may be concerned with problems of increase of the size of a mold and need of change of design in each occasion of new installations if the intake air passage defining member 4 is molded by resin with the butterfly valve-type throttle valve 10 inserted. However, such problems may be improved by rotatably supporting the valve shaft 12 on the intake air passage defining member 4 and coupling the split members 20(1) and 20(2) to each other with the valve shaft 12 interleaved therebetween.

Furthermore, a peripheral edge groove portion 37 having a U-shaped cross section (see FIG. 11) can be defined as the circumferential groove portions 25 of the split members 20(1) and 20(2) align with each other. In addition, at opposite ends of the valve body 14, the groove portions 28 extending in the direction about the axis of the split members 20(1) and 20(2) are connected in series in forms of circular rings (see FIGS. 10 and 11) as the boss portions 26 of the split members 20(1) and 20(2) align with each other.

The gap closing members 16 will now be described. Because two pieces of the gap closing members 16 are used in a pair, one of the gap closing members 16 (lower one in the drawings) will be described. As shown in FIG. 6, the gap closing member 16 is made, for example, of resin and is formed as a substantially C-shaped ring. The gap closing member 16 is formed to have an oblong cross section with a crosswise width 16w that is larger than a thickness 16t (see FIG. 8).

As shown in FIG. 6, as primary portions, the gap closing member 16 has a circumferential seal portion 38 and seal portions 39 in a direction about an axis, which are in series with opposite ends of the circumferential seal portion 38. The circumferential seal portion 38 is curved to have a semicircular arc shape with respect to a widthwise direction and corresponds to the circumferential groove portion 25 of the one split member 20(1). In addition, the seal portions 39 in the direction about the axis are each curved to have a U-shape configuration and correspond to the groove portions 28 extending in the direction about the axis of the split member 20(1), respectively. The gap closing member 16 is configured to be able to resiliently deform or to flexibly deform and can flexibly deform in a thickness direction, a widthwise direction and a torsional direction.

For example, prior to coupling the split members 20(1) and 20(2) to each other, the gap closing members 16 are assembled with the respective split members 20, and the split members 20(1) and 20(2) are then coupled to each other with the valve shaft 12 interleaved therebetween. Thus, in order to position the gap closing members 16 on the split members 20, the seal portions 39 in the direction about the axis are fitted with the respective groove portions 28 in the direction about the axis, and the circumferential seal portions 38 are positioned at the circumferential groove portions 25 disposed on one side. At that time, the seal portions 39 of the gap closing members 16 in the direction about the axis are inserted into the grooves 28 in the direction about the axis such that they are each rotated from the position indicated by two-dot chain lines about the overlapping central line 20L (see arrow Y in FIG. 7). Hence, it is possible to easily assemble the gap closing members 16 with the split members 20 without causing substantial deformation.

Thereafter, the split members 20(1) and 20(2), to which the gap closing members 16 have been assembled, are coupled to each other in back-to-back relationship by the welding means 36 as described previously, so that it is possible to assemble the gap closing members 16 to the valve body 14 without causing substantial deformation (see FIGS. 2 to 5). By assembling the gap closing members 16 to the valve body 14 without causing substantial deformation in this way, its assembling operation can be easily performed, and it is possible to prevent or reduce the brakeage of the gap closing members 16, which may be caused by the deformation. It is also possible to mount the gap closing members 16 to the valve body 14 by utilizing the resilient deformation (flexible deformation) after the coupling between the split members 20(1) and 20(2)

Through coupling between the split members 20(1) and 20(2), the inner circumferential parts of the circumferential seal portions 38 of the gap closing members 16 are supported within the peripheral edge groove portion 37 (see FIG. 11) that is cooperatively defined by the circumferential groove portions 25 of the split members 20(1) and 20(2). In this state, the outer circumferential parts of the circumferential seal portions 38 of the gap closing members 16 protrude from the circumferential end surfaces 21a of the valve body 14 (see FIGS. 3 and 4).

In addition, the circumferential seal portions 38 are supported within the peripheral edge groove portion 37 (see FIG. 11) in a loose fit fashion, and the seal portions 39 in the direction about the axis are supported within the groove portions 28 in the direction about the axis in a loose fit fashion. Hence, the gap closing members 16 are mounted to the valve body 14 such that they can move and flexibly deform in the diametrical direction, the thickness direction and the circumferential direction of the valve body 14.

According to the butterfly valve-type throttle valve 10 (see FIG. 1) described above, the flow rate of the intake air flowing though the intake air passage 5 can be adjusted by the rotation of the butterfly valve-type valve body 14 in unison with the valve shaft 12 that extends across the intake air passage 5. In addition, it is configured such that the two split members 20(1) and 20(2) constituting the valve body 14 are coupled to each other via the welding means 36, which uses no screw, and the axial hole 34 for fitting with the valve shaft 12 can be defined through the coupling (see FIGS. 10 and 11). Hence, it is possible to solve the problem caused by screws of the prior art butterfly valve-type throttle valve 10 (for example, see Patent Document 1) and to improve the reliability in fixing the valve body 14 to the valve shaft 12. In addition, because no screw is used, the number of parts and the number of assembling steps can be reduced, and the cost of the butterfly valve-type throttle valve 10 can be reduced.

In addition, the two gap closing members 16 provided at the peripheral edge portion of the valve body 14 can close the gap produced between the valve body 14 in the fully closed position and the passage wall surface 5a of the intake air passage 5, so that it is possible to reduce the amount of leakage of the flow of the intake air when in the fully closed position. More specifically, due to the synergetic operation by the movement and the flexible deformation of the gap closing members 16 relative to the valve body 14 in the fully closed position, it is possible to prevent the gap closing members 16 from biting into the passage wall surface 5a of the intake air passage 5 while the gap between the valve body 14 and the passage wall surface 5a can be closed or reduced. Hence, it is possible to reduce the amount of leakage of the flow of the intake air when in the fully closed position. Therefore, even in the case that the fully closed positions of the valve bodies 14 are not uniform in the multiple-type variable intake air valve device 3, it is possible to reduce the amount of leakage of the flow of the intake air within each intake air passage 5 and to eventually improve the output performance of the engine.

In addition, it is configured such that the peripheral edge groove portion 37 (see FIG. 11) for fitting with the gap closing members 16 is defined through coupling between the two split members 20(1) and 20(2) that constitute the valve body 14. Therefore, by coupling between the two split members 20(1) and 20(2), it is possible to easily form the peripheral edge groove portion 37 for fitting with the gap closing members 16.

Further, with the engaging means provided between the valve shaft 12 and the axial bore 34 of the valve body 14, i.e., the two-face width like fitting shaft portion 19 and the axial bore 34 fitting with the fitting shaft portion 19, it is possible to reliably prevent relative rotation in the direction about the axis between the valve shaft 12 and the valve body 14.

Furthermore, by forming the two split members 20(1) and 20(2) of resin, it is possible to reduce the weight of the valve body 14 and to improve the durability of the butterfly valve-type throttle valve 10 against vibrations. The valve body 14 constituted by the two resin split members 20(1) and 20(2) can eliminate machining operations required for a metal valve body 14.

Furthermore, it is possible to easily couple the split members 20 to each other by coupling the two resin split members 20(1) and 20(2) to each other by the welding means 36.

Furthermore, because the two split members 20(1) and 20(2) are the same components, it is possible to mold the split members 20(1) and 20(2) by using a single mold, and therefore, it is possible to improve the productivity and to simplify the component management.

Embodiment 2

Figure 12:
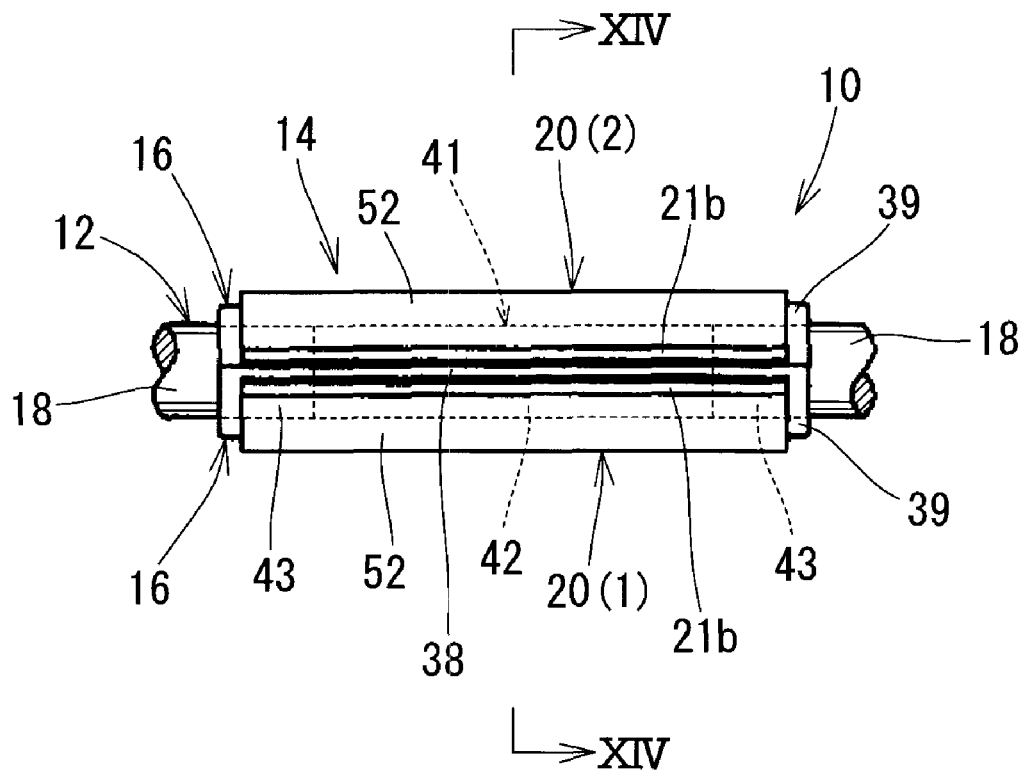
[FIG. 12] This is a front view showing a butterfly valve-type throttle valve according to Embodiment 2 of the present invention.
Figure 13:
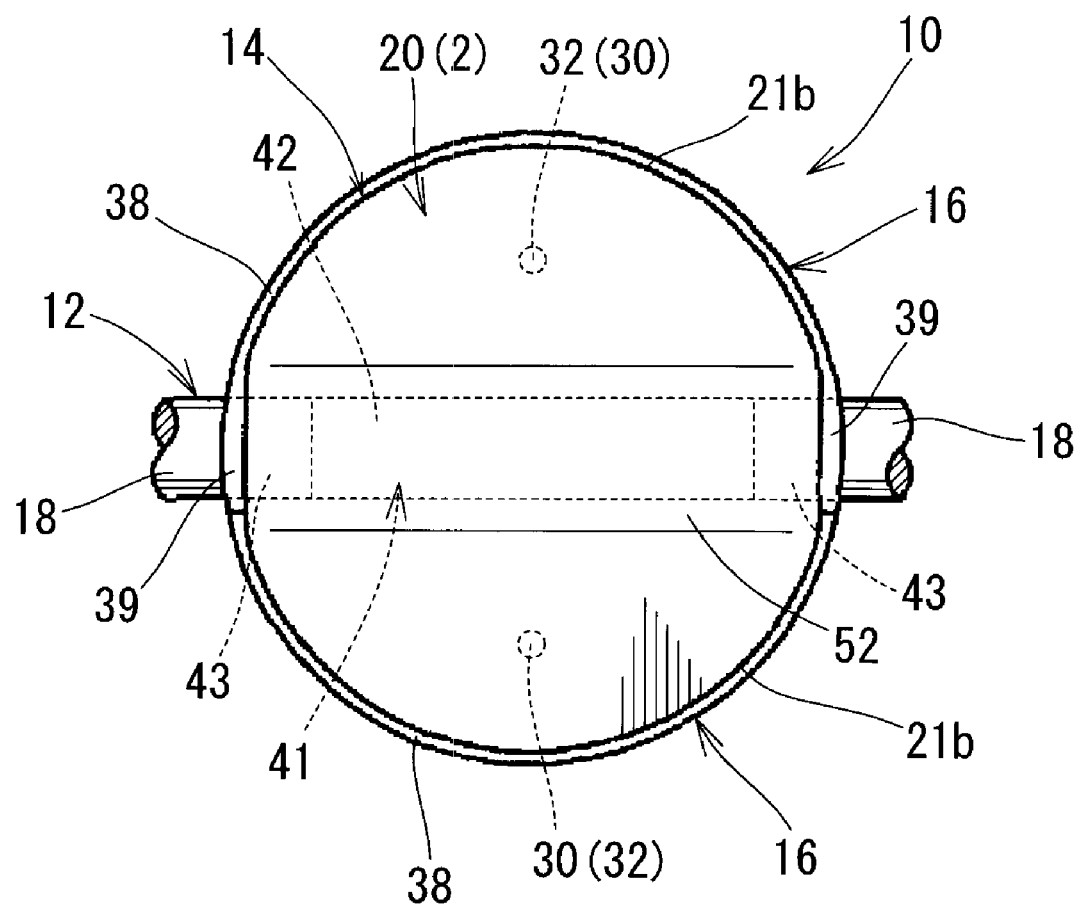
[FIG. 13] This is a plan view of the butterfly valve-type throttle valve.
Figure 14:
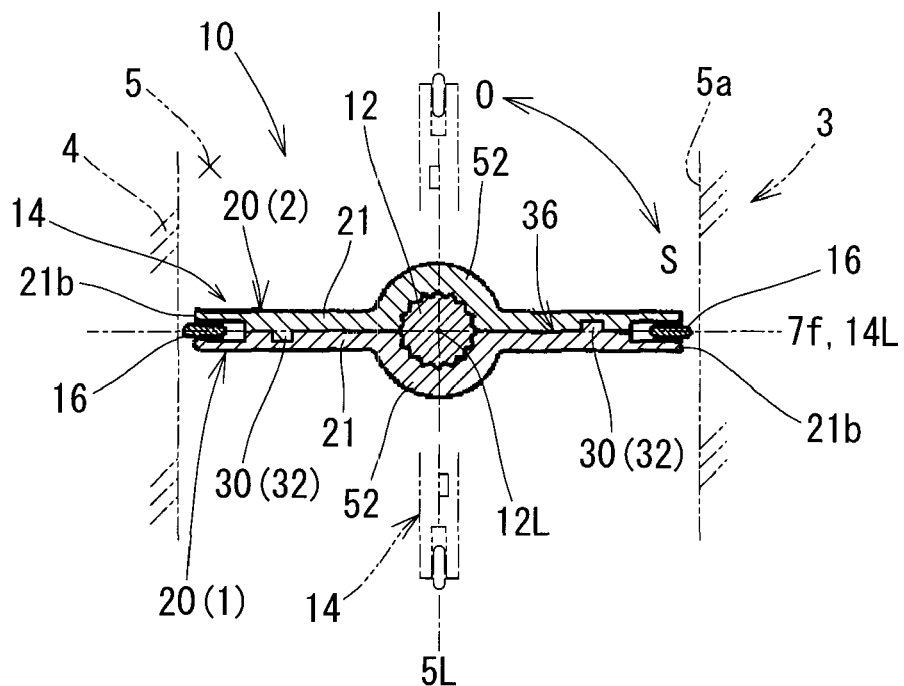
[FIG. 14] This is a cross sectional view taken along line XIV-XIV in FIG. 12.

An Embodiment 2 of the present invention will now be described with reference to the drawings. This embodiment and its subsequent embodiments are modifications of a part of the Embodiment 1. Therefore, the description will be made to the modified portion and repeated description will be omitted. FIG. 12 is a front view showing the butterfly valve-type throttle valve 10, FIG. 13 is a plan view of the same, and FIG. 14 is a sectional view taken along line XIV-XIV in FIG. 12.

The fully closed position (see solid lines 14 in FIG. 14) of the valve body 14 of the butterfly valve-type throttle valve 10 in the multiple-type variable intake air valve device 3 of this embodiment is set to a position where the central line (central plane) 14L of the valve body 14 passing through the axis 12L of the valve shaft 12 is aligned with a plane 7f that is perpendicular to the axis 5L of the intake air passage 5 of the intake passage defining member 4 and includes the axis 12L of the valve shaft 12. In this case, a set angle 14θ (see FIG. 1) is 0 (zero).

Also in this embodiment, the intake air passage 5 is opened as the valve body 14 rotates in an open direction (see arrow O in FIG. 14) from the fully closed position, and a fully opened position (see two-dot chain lines in FIG. 14) is set to be the position where the central line (central plane) 14L of the valve body overlaps with the axis 5L of the intake air passage 5. The intake air passage 5 is closed as the valve body 14 rotates in a closing direction (see arrow S in FIG. 14) from the fully opened position. According to the change in the fully closed position of the valve body 14, a circumferential end surface (labeled with numeral 21b) of the valve body 14 is formed as a cylindrical surface that is parallel to the passage wall surface 5a of the intake air passage 5 when the vale body 14 is in the fully closed position.

Figure 15:
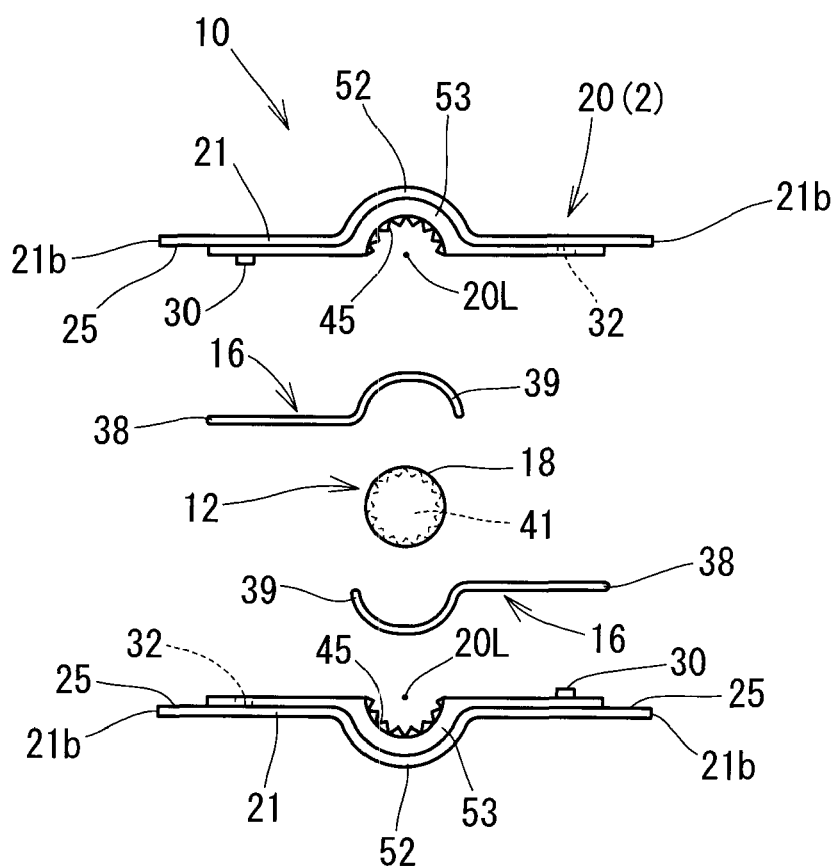
[FIG. 15] This is a side view showing components of the butterfly valve-type throttle valve in an exploded form.
Figure 16:
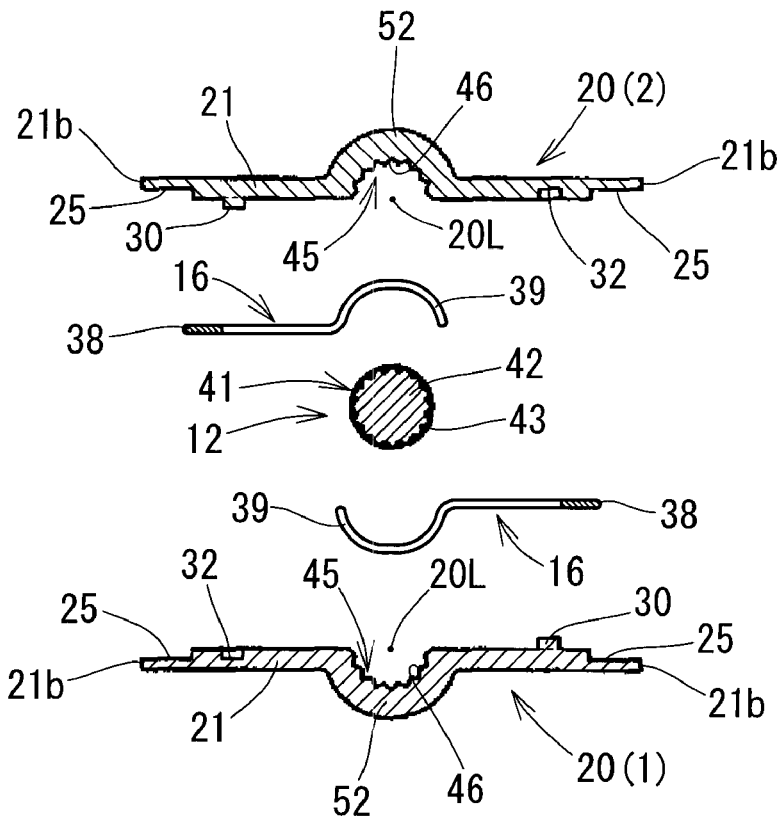
[FIG. 16] This is a side sectional view showing the components of the butterfly valve-type throttle valve in an exploded form.

The butterfly valve-type throttle valve 10 will now be described. FIG. 15 is a side view showing the components of the butterfly valve-type throttle valve 10 in an exploded form, FIG. 16 is a side view of the same, FIG. 17 is a plan view showing the fitting relation between the split members and the valve shaft, and FIG. 18 is a side view of the valve body.

Figure 17:
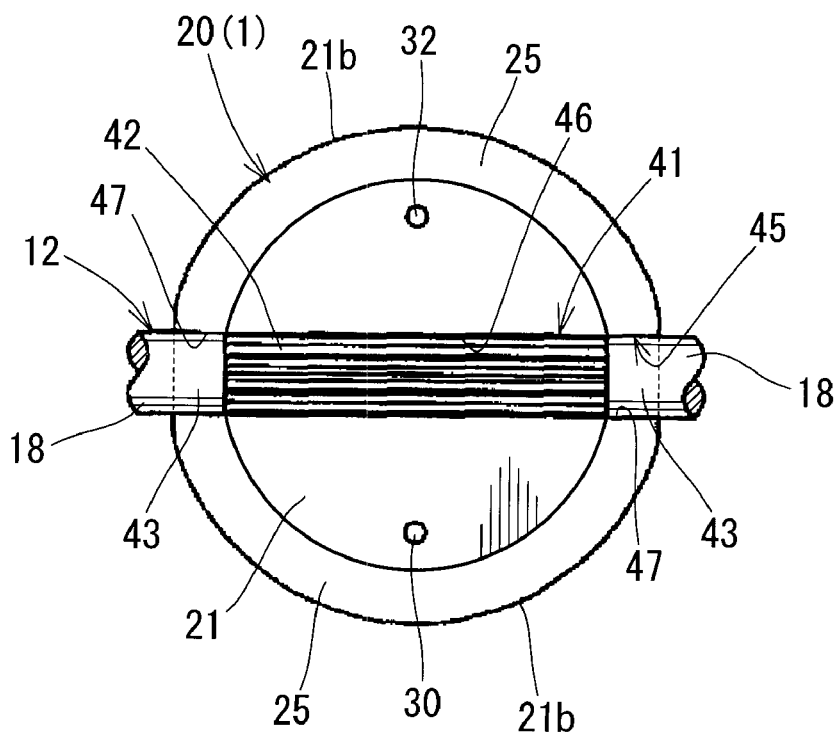
[FIG. 17] This is a plan view showing the fitting relation between split members and a valve shaft.
Figure 18:
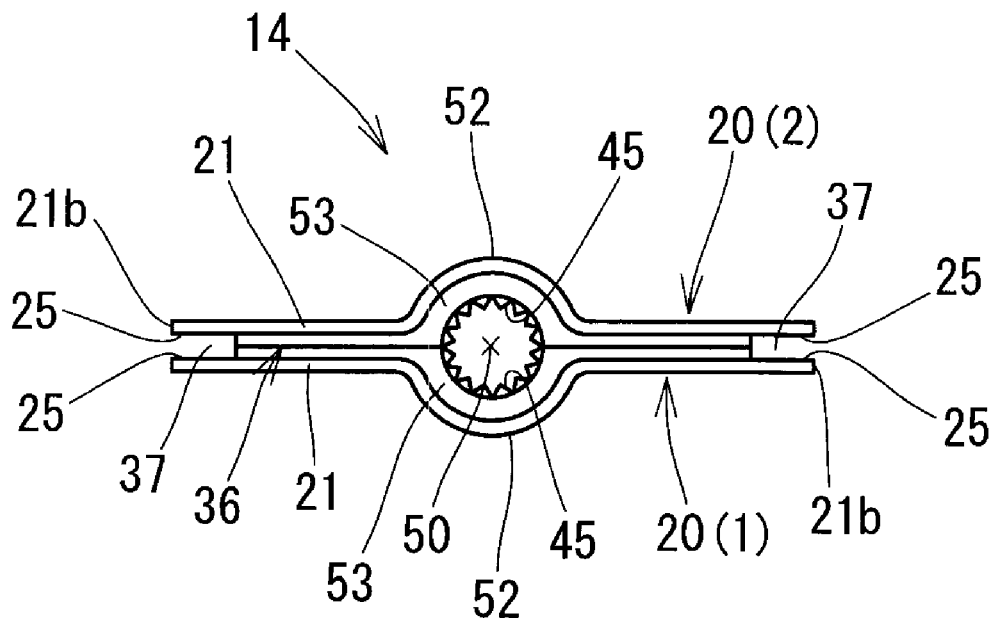
[FIG. 18] This is a side view showing a valve body.

As shown in FIG. 17, a fitting shaft portion (labeled with numeral 41) is provided on the valve shaft 12 in place of the two-face width like fitting shaft portion 19 (see FIG. 9) of the Embodiment 1. The fitting shaft portion 41 is formed with a knurled shaft portion 42 extending within a length shorter than the length of axial grooves (labeled with numeral 45) of the split members 20, and intermediate shaft portions 43 formed on opposite ends of the knurled shaft portion 42 and in continuity with the support shaft portions 18. The tooth tip circle of the knurled shaft portion 42 is set to have a diameter smaller than a diameter of the support shaft portions 18.

An axial groove 45 of each of the split members 20 is formed to be able to be fitted with the fitting shaft portion 41 of the valve shaft 12. The axial groove 45 has a knurled groove portion 46 engageable with the knurled shaft portion 42 of the fitting shaft portion 41, and intermediate groove portions 47 that can be fitted with the respective intermediate shaft portions 43 of the fitting shaft portion 41. Therefore, through fitting or engagement between the fitting shaft portion 41 (more specifically, the knurled shaft portion 42) and an axial bore (labeled with numeral 50, see FIG. 18) formed by the axial grooves 45 (more specifically, the knurled groove portions 46), the valve shaft 14 is prevented from rotating relative to the valve body 12 in the direction about the axis and is positioned with respect to the axial direction (see FIGS. 14 and 17). The fitting shaft portion 41 (more specifically, the knurled shaft portion 42) and the axial bore 50 formed by the axial grooves 45 (more specifically, the knurled groove portions 46) for fitting therewith constitute "engaging means" referred to in this description.

As shown in FIG. 15, a semi-cylindrical boss portion 52 that defines the axial groove 45 is formed on each surface of the valve body 14. The boss portion 52 is formed as including opposite boss portions 26 of the Embodiment 1 in continuity therewith. Thus, the boss portion 52 extends linearly in a diametrical direction along the overlapping central line 20L.

Groove portions (labeled with numeral 53) in the direction about the axis formed on opposite ends of the boss portion 52 of each split member 20 are configured as semi-circular stepped grooves opening on the back surface sides of the main plate portions 21.

In addition, the valve shaft 12, the split members 20 and the gap closing members 16 of this embodiment can be assembled in the same manner as the Embodiment 1 (see FIGS. 12 and 13).

Also with the butterfly valve-type throttle valve 10 of the Embodiment 2 described above, the same operations and advantages as the Embodiment 1 can be achieved.

In addition, it is possible to ensure prevention of rotation about the axis between the valve shaft 12 and the valve body 14 by the engaging means provided between the valve shaft 12 and the axial bore 50 or by the fitting shaft portion 41 (more specifically, the knurled shaft portion 42, see FIG. 17) of the valve shaft 12 and the axial bore 50 (see FIG. 18) defined by the axial grooves 45 (more specifically, knurled groove portions 46). Further, because the knurled shaft portion 42 of the fitting shaft portion 41 of the valve shaft 12 extends within a length shorter than the length of axial grooves (labeled with numeral 45) of the split members 20, it is possible to simplify the structure of a mold that is required for forming the knurled shaft portion 42.

Further, the groove portions 53 in the direction about the axis of the boss portion 52 of each split member 20 are configured as semi-circular stepped grooves opening on the back surface sides of the main plate portions 21. Therefore, it is possible to easily perform the fitting operation in such a manner that the seal portions 39 in the direction about the axis of the gap closing members 16 are overlapped with the respective groove portions 53 in the direction about the axis.

Embodiment 3

Figure 19:
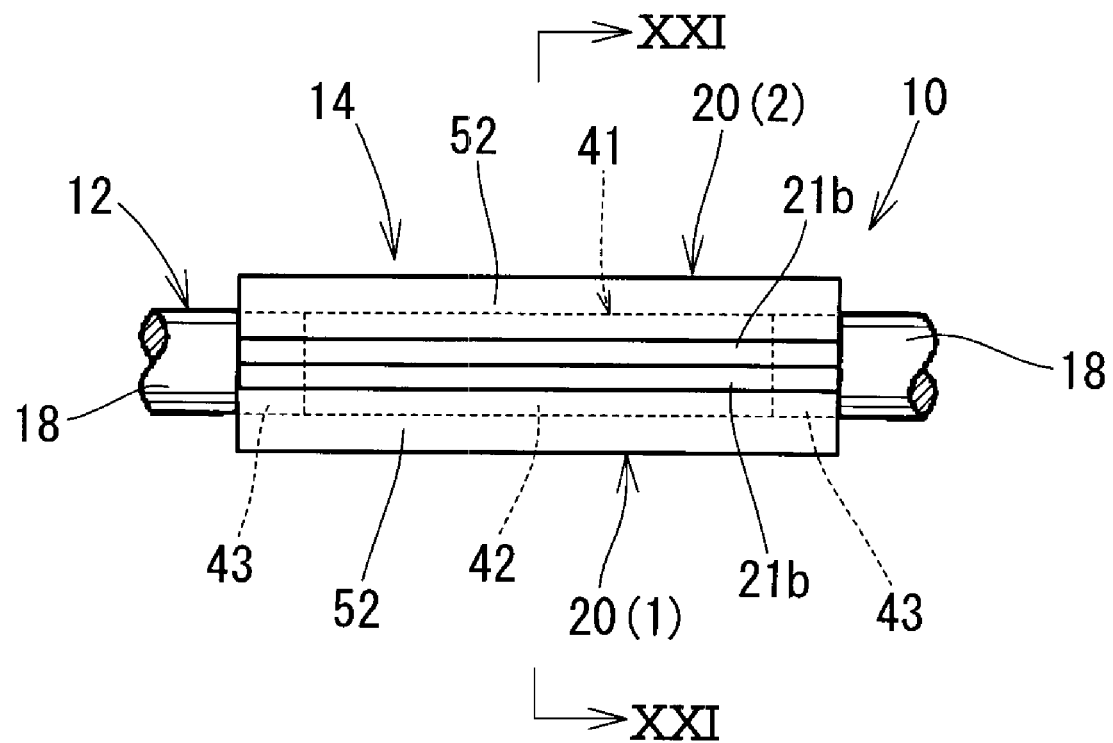
[FIG. 19] This is a front view showing a butterfly valve-type throttle valve according to Embodiment 3 of the present invention.
Figure 20:
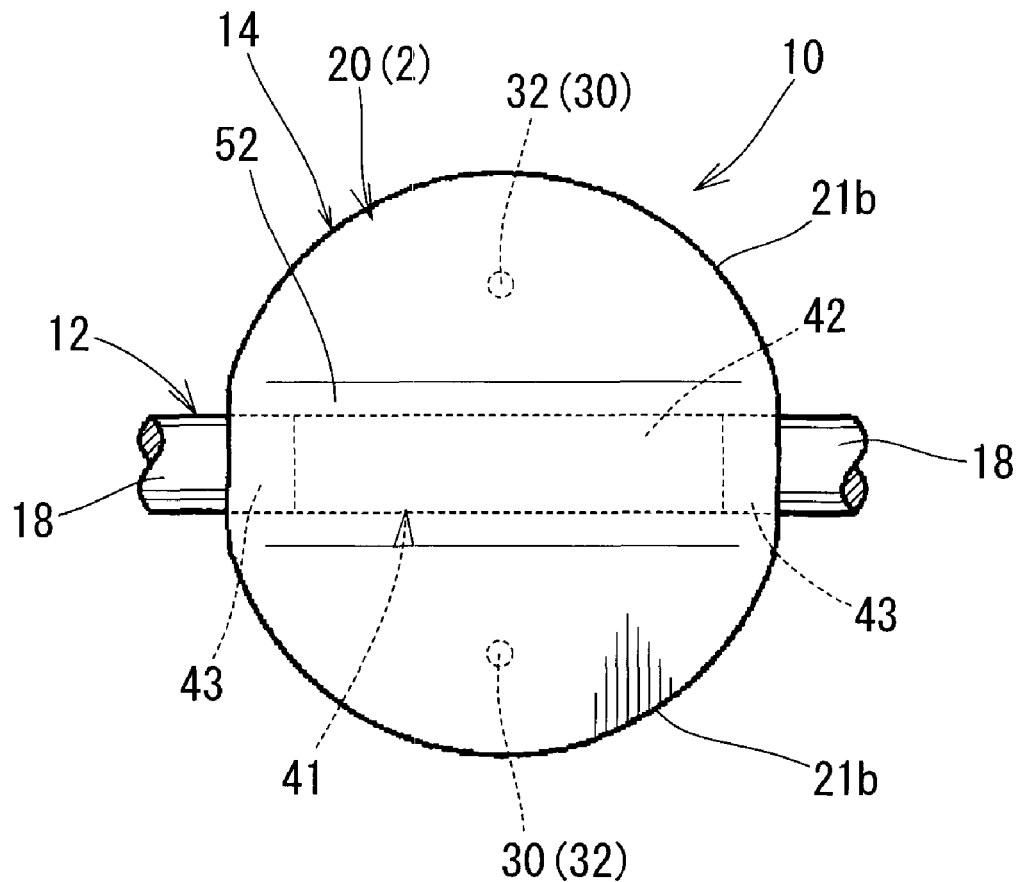
[FIG. 20] This is a plan view of the butterfly valve-type throttle valve.
Figure 21:
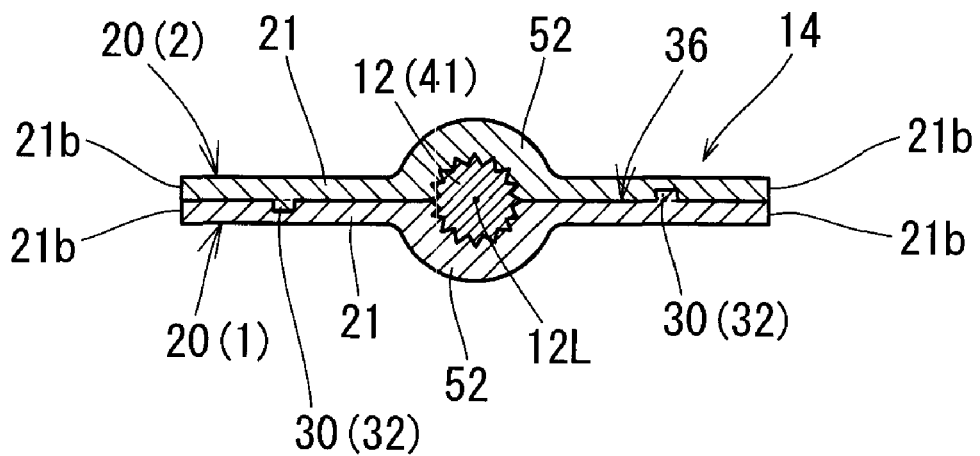
[FIG. 21] This is a cross sectional view taken along line XXI-XXI in FIG. 19.
Figure 22:
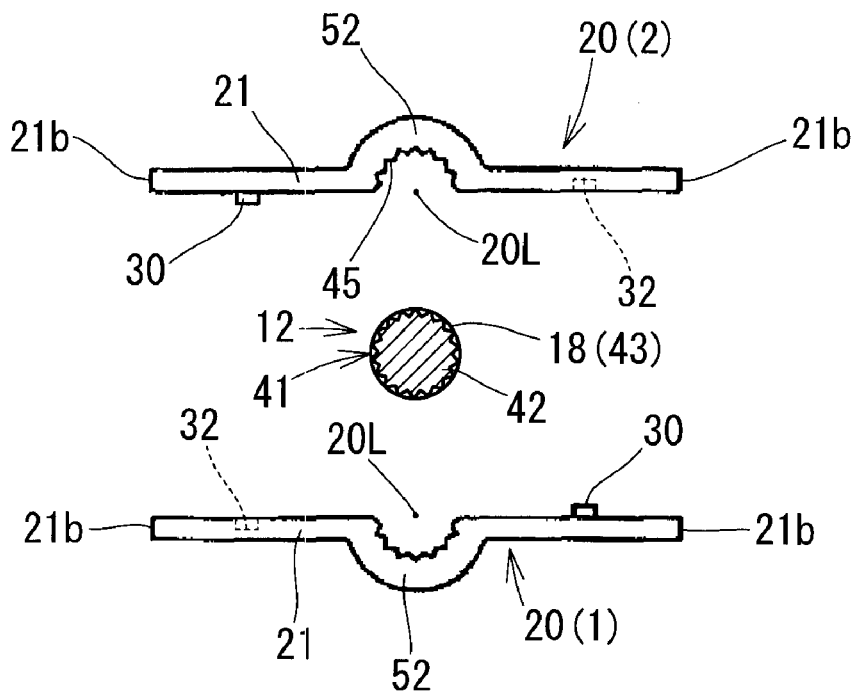
[FIG. 22] This is a side view showing components of the butterfly valve-type throttle valve in an exploded form.
Figure 23:
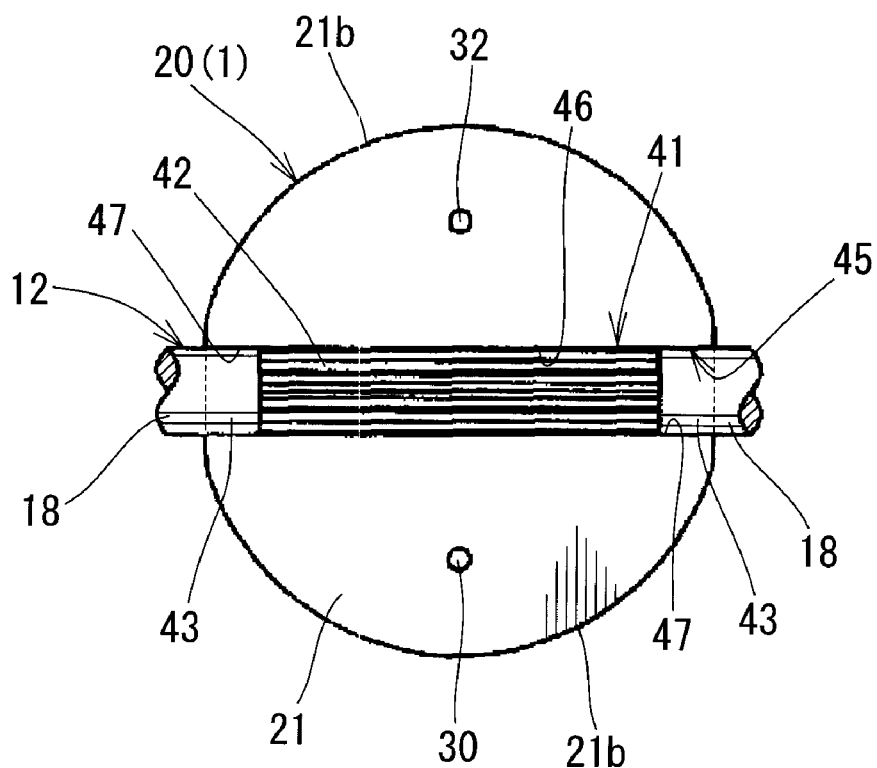
[FIG. 23] This is a plan view showing the fitting relation between split members and a valve shaft.
Figure 24:
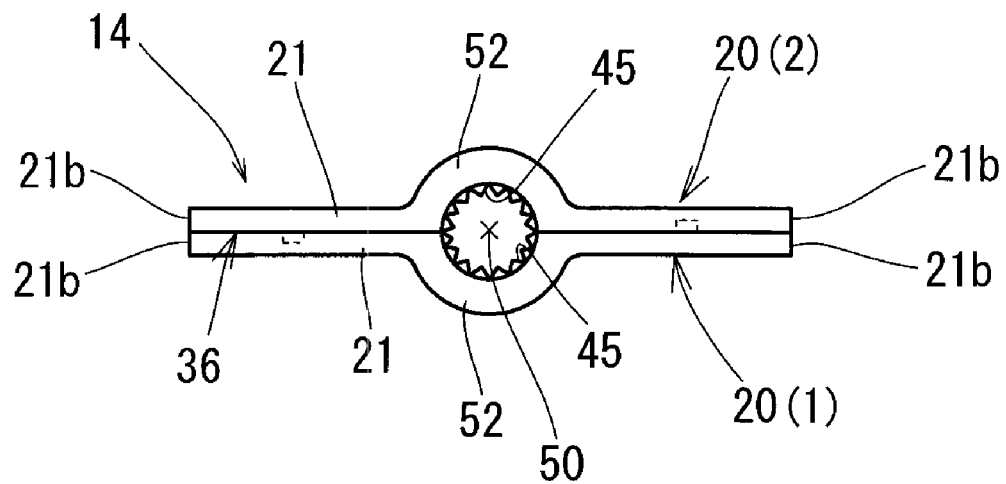
[FIG. 24] This is a side view showing a valve body.

An Embodiment 3 of the present invention will now be described with reference to the drawings. FIG. 19 is a front view showing a butterfly valve-type throttle valve, FIG. 20 is a plan view of the same, FIG. 21 is a sectional view taken along line XXI-XXI in FIG. 19, FIG. 22 is a side view showing the components of the butterfly valve-type throttle valve in an exploded form, FIG. 23 is a plan view showing the fitting relation between split members of a valve body and a valve shaft, and FIG. 24 is a side view of the valve body.

According to this embodiment, the gap closing members 16 are omitted from the butterfly valve-type throttle valve 10 of the Embodiment 2 (see FIGS. 19 to 24). In this connection, the circumferential groove portions 25 and the groove portions 53 in the direction about the axis of the split members 20 of the valve body 14 are omitted, the peripheral edge portions of the main plate portions 21 are configured simply as circumferential end surfaces 21b, and end faces of each of the boss portions 52 are configured simply as flat surfaces.

Also with the butterfly valve-type throttle valve 10 of the Embodiment 3 described above, it is possible to achieve the same operations and advantages as the Embodiment 2.

In addition, it is possible to reduce the number of parts of the butterfly valve-type throttle valve 10 by the omission of the gap closing members 16.

Further, the configuration of the split members 20 can be simplified, and therefore, the structure of a mold for forming the split members 20 can be simplified.

Embodiment 4

Figure 25:
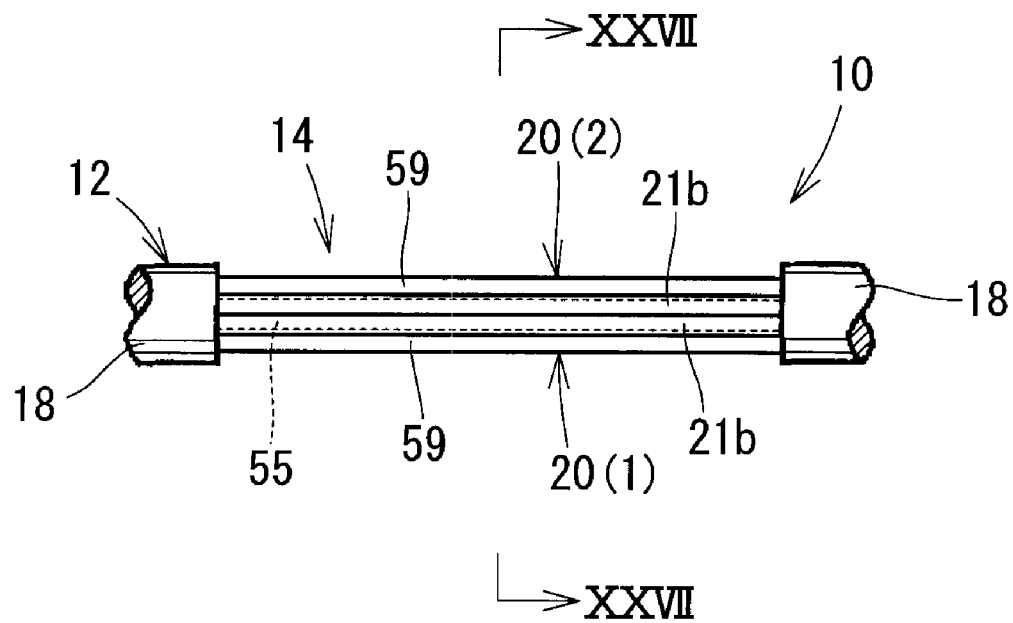
[FIG. 25] This is a front view showing a butterfly valve-type throttle valve according to Embodiment 4 of the present invention.
Figure 26:
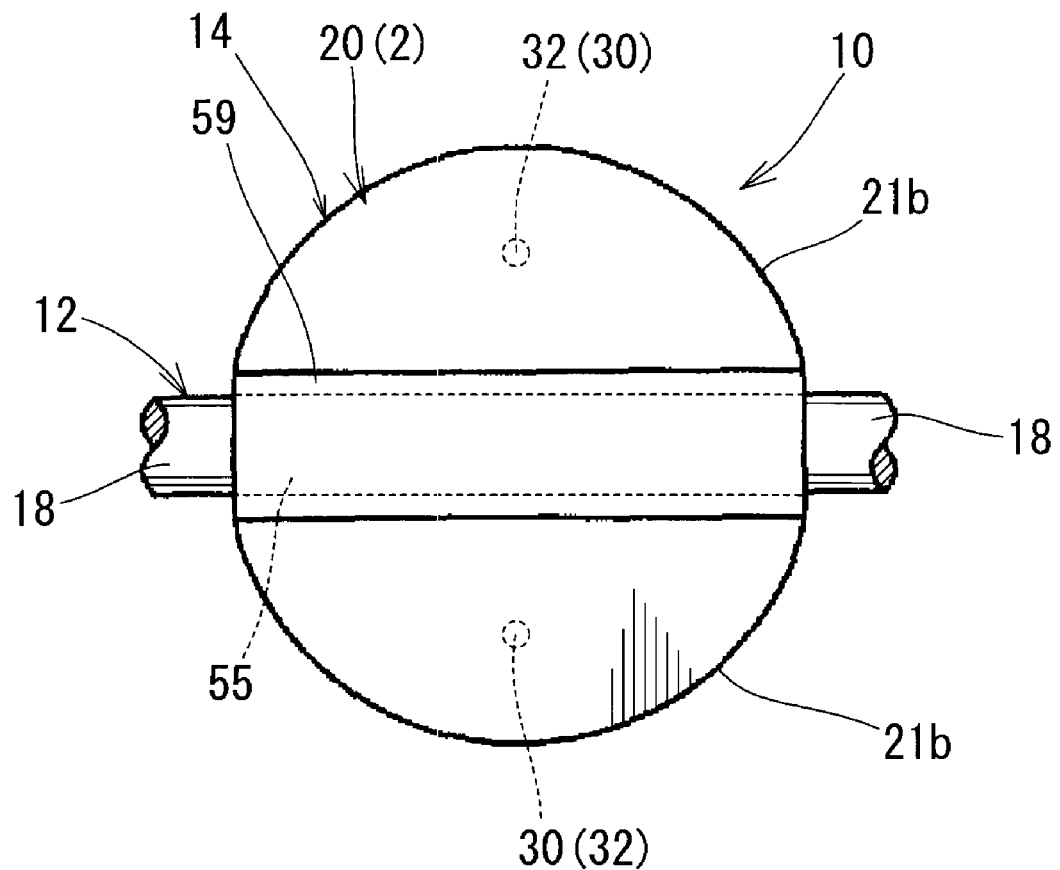
[FIG. 26] This is a plan view of the butterfly valve-type throttle valve.
Figure 29:
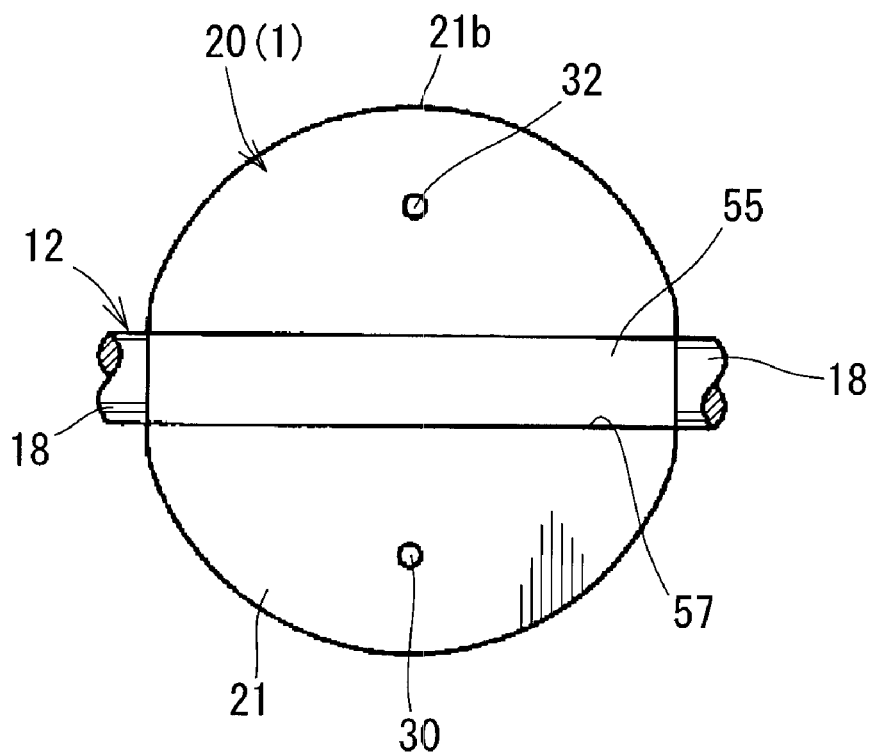
[FIG. 29] This is a plan view showing the fitting relation between split members of a valve body and a valve shaft.
Figure 30:
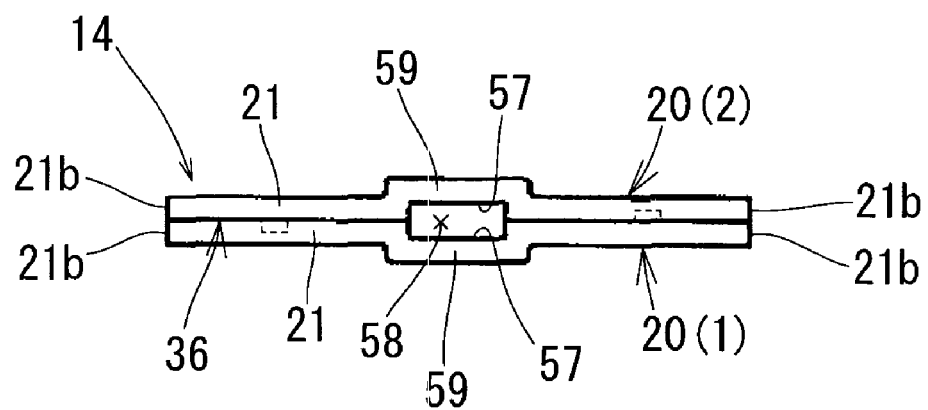
[FIG. 30] This is a side view showing the valve body.

An Embodiment 4 of the present invention will now be described with reference to the drawings. FIG. 25 is a front view showing a butterfly valve-type throttle valve, FIG. 26 is a plan view of the same, FIG. 27 is a sectional view taken along line XXVII-XXVII in FIG. 25, FIG. 28 is a side view showing the components of the butterfly valve-type throttle valve in an exploded form, FIG. 29 is a plan view showing the relation between split members of a valve body and a valve shaft, and FIG. 30 is a side view of the valve body.

According to this embodiment, a part of the Embodiment 3 is modified. Thus, as shown in FIGS. 27 to 29, a fitting shaft portion (labeled with numeral 55) is provided in place of the fitting shaft portion 41 (see FIG. 17) of the Embodiment 2 is replaced. As shown in FIG. 28, the fitting shaft portion 55 is configured as a rectangular shaft having a rectangular cross section and extending parallel to the split members 20. The fitting shaft portion 55 is configured to have a rectangular cross section having a thickness 55t and a width 55w and inscribed in a virtual cylindrical plane that is an extension of the outer circumferential surfaces of the support shaft portions 18.

In addition, axial grooves (labeled with numeral 57) of the split members 20 are configured to be able to be fitted with the fitting shaft portion 55 of the valve shaft 12. Thus, each axial groove 57 has a groove depth 57 of half the thickness 55t of the fitting shaft portion 55 and a groove width 57w equal to the width 55w of the fitting shaft portion 55. Therefore, the valve body 14 is prevented from rotating in the direction about the axis and is positioned with respect to the axial direction (see FIGS. 27 and 29) through fitting or engagement between the fitting shaft portion 55 of the valve shaft 12 and an axial bore (labeled with numeral 58, see FIG. 30) defined by the axial grooves 57 of the split members 20. The rectangular shaft like fitting shaft portion 55 and the axial bore 58 defined by the axial grooves 57 for fitting therewith constitute "engaging means" referred to in this description.

Figure 27:
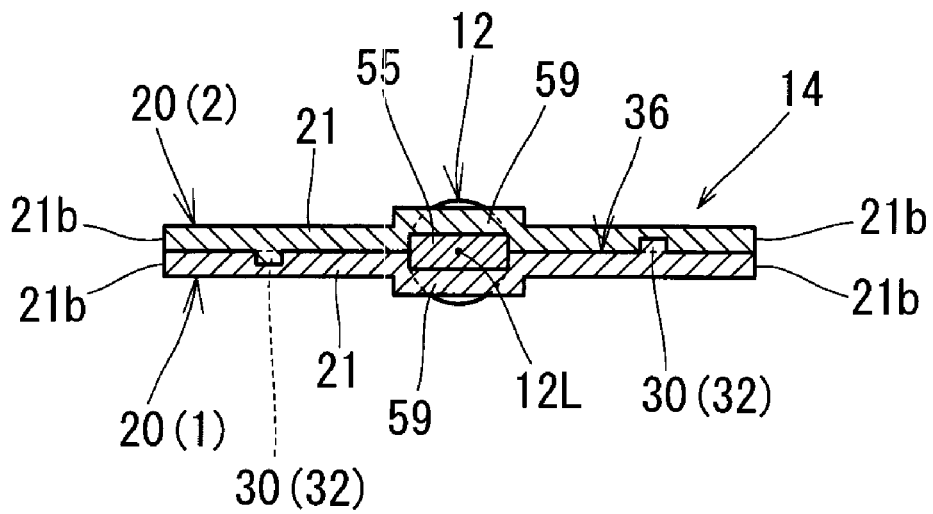
[FIG. 27] This is a cross sectional view taken along line XXVII-XXVII in FIG. 25.
Figure 28:
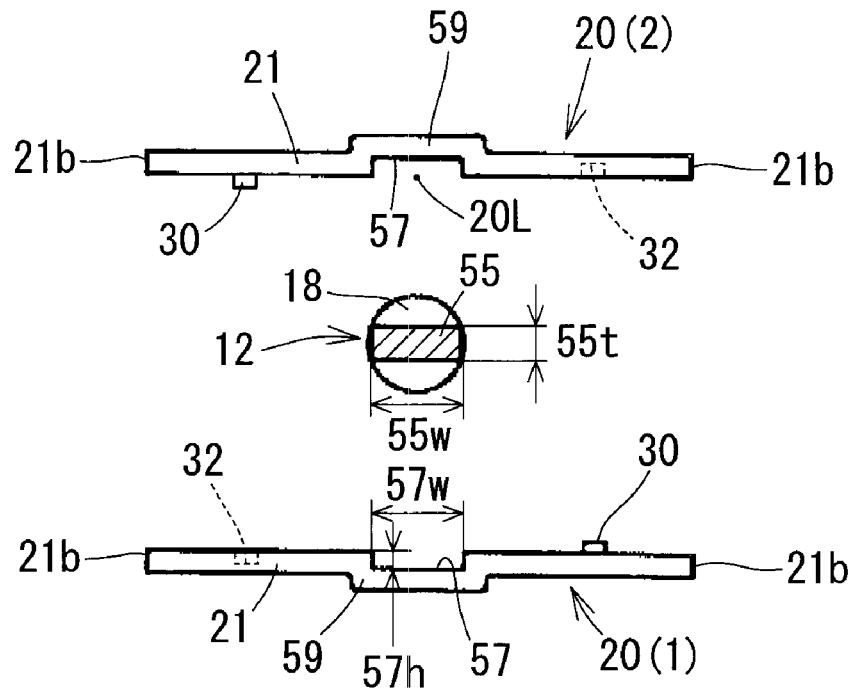
[FIG. 28] This is a side view showing components of the butterfly valve-type throttle valve in an exploded form.

Further, as shown in FIGS. 27 and 28, rectangular semi-tubular boss portions 59 defining the axial groove 57 are formed on the surfaces of the valve body 14 in place of the boss portions 52 of the Embodiment 3.

Also with the butterfly valve-type throttle valve 10 of the Embodiment 4, the same operations and advantages as the Embodiment 3 can be achieved.

The prevent invention may not be limited to the above embodiments but may be modified within a range that does not depart from the primary features of the invention. For example, although the butterfly valve-type throttle valves 10 applied to the multiple-type variable intake air valve devices 3 are exemplified in the above embodiments, the present invention may be applied to a butterfly valve-type throttle valve having a single valve body as in a throttle valve device. In addition, the material of the valve shaft 12 may be metal or resin or may be other materials. The valve body 14 may not be limited to that having a circular plate-like configuration as in the above embodiments and may have an oblong plate-like configuration, a rectangular plate-like configuration, etc., depending on the cross sectional configuration of the intake air passage 5.

In addition, the material of the split members 20 of the valve body 14 may be resin or metal or may be of other materials. The plurality of split members 20 of the valve body 14 may be the same components or may be formed as split members having different configurations from each other. The valve body 14 may not be limited to that divided into two parts as exemplified in the above embodiments but may be divided into three or more parts as long as the axial bore 34, 50 or 58 can be formed. A structure for separating a portion of the valve body 14 other than the portion defining the axial bore 34, 50 or 58 may not affect to the primary features of the invention. For example, the split members 20 defining the circumferential groove portions that are fitted with the gap closing members 16 may be split members that are different from the split members 20 for defining the axial bore 34, 50 or 58.

Further, as long as no screw is used, the coupling means for the split members 20(1) and 20(2) may be of any coupling means, such adhesion means using adhesives, crimping means for crimping with heat, press-fitting means and snap fitting means utilizing resilient deformation, other than the welding means 38. Further, although the split members 20(1) and 20(2) are coupled to each other with the valve shaft 12 interleaved therebetween in the above embodiments, it may be possible to integrate the valve body 14 with the valve shaft 12 by press-fitting the valve shaft 12 axially into the axial bore 23, 50 or 58 of the valve body 14 having the split members 20(1) and 20(2) coupled to each other. Furthermore, although the split members 20 for defining the peripheral edge groove portions for fitting with the gap closing members 16 may be coupled to each other by coupling means that uses no screw, they may be coupled to each other by using screws.

The configuration of the axial bore 34, 50 or 58 of the valve body 14 and the configuration of the fitting shaft portion 19, 41 or 55 may be suitable changed as long as they can be fitted with each other. It is only necessary for the engaging means provided between the fitting shaft portion 19, 41 or 55 and the axial bore 34, 50 or 58 to prevent rotation about the axis relative to each other through engagement. For example, the fitting shaft portion may have an oblong configuration, a polygonal configuration or a D-shape in cross section and the axial bore may be formed so as to be engageable therewith. A projection (or a recess) may be formed on an outer circumferential surface of the fitting shaft portion, and the axial hole may be formed with a recess (or a projection) engageable with the projection (or the recess) of the fitting shaft portion. The positioning of the valve shaft 12 and the valve body 14 relative to each other in the axial direction by the engaging means is of a non-limiting nature and may be omitted. Although it may be preferable that the valve shaft 12 and the valve body 14 are prevented from rotation relative to each other about the axis and are positioned relative to each other in the axial direction by using the engaging means, it may be possible to provide positioning means that can position the valve shaft 12 and the valve body 14 relative to each other in the axial direction separately from the engaging means. Further the valve shaft 12 and the valve body 14 can be prevented from rotation and/or can be positioned in the axial direction relative to each other by utilizing a frictional resistance that may be produced between their surfaces contacting with each other. The positioning means constituted by the positioning projections 30 and the positioning recesses 32 provided on the split members 20(1) and 20(2) may be increased in number or may be omitted. The positioning projections 30 and the positioning recesses 32 provided on the split members 20(1) and 20(2) may be changed in their relationship in arrangement, their configurations, etc. as long as they can be fitted with each other. Further, it is possible to form the surfaces of the split members 20 to have streamline configurations in order to enable the intake air to be smoothly flown. Further, it is possible to provide rib-like projections for rectifying the flow of the intake air or to provide reinforcing ribs for the purpose of reinforcement.

Furthermore, the material of the gap closing members 16 may be metal or resin or may be of other materials. Although two gap closing members 16 are provided along the entire circumference of the peripheral edge portion of the valve body 14 in the above embodiments, it is possible to partly provide the gap closing member 16 along a part of the peripheral edge portion of the valve body 14. Further, the gap closing member 16 may have a groove in its inner circumferential surface and may be fitted on the peripheral edge portion of the valve body 14 from the outer side such that the peripheral edge portion of the valve body 14 is received within the groove.

The invention claimed is:

1. A butterfly-type throttle valve comprising:
a valve shaft extending across an intake air passage of an internal combustion engine;
a butterfly-type valve body constructed to enable adjustment of a flow rate of intake air flowing through the intake air passage by rotating in unison with the valve shaft, the valve body comprising a plurality of first split members jointly defining an axial bore for fitting with the valve shaft;
a first coupling device including no screw and constructed to couple the split members together; and
a gap closing member disposed on a peripheral edge portion of the valve body, wherein the gap closing member is constructed to close a gap that is produced between the valve body and a passage wall surface of the intake air passage when the valve body is in a fully closed position;
wherein:
the valve body further includes a plurality of second split members constructed to jointly define a peripheral edge groove portion of the valve body, the peripheral edge groove portion being configured to be able to be fitted with the gap closing member; and
the throttle valve further comprises a second coupling device constructed to couple the second split members together.

2. A butterfly-type throttle valve comprising:
a valve shaft extending across an intake air passage of an internal combustion engine;
a butterfly-type valve body constructed to enable adjustment of a flow rate of intake air flowing through the intake air passage by rotating in unison with the valve shaft, the valve body comprising a plurality of first split members jointly defining an axial bore for fitting with the valve shaft;
a first coupling device including no screw and constructed to couple the split members together; and
an engaging device disposed between the valve shaft and an inner circumferential wall of the axial bore and constructed to prevent rotation of the valve shaft and the valve body relative to each other about an axis of the valve shaft.

3. The butterfly-type throttle valve as in claim 1, wherein each of the first split member is made of resin.

4. The butterfly-type throttle valve as in claim 1, wherein each of the second split members is made of resin.

5. The butterfly-type throttle valve as in claim 3, wherein the first coupling device comprises means for welding the first split members together.

6. The butterfly-type throttle valve as in claim 4, wherein the second coupling device comprises means for welding the second split members together.

7. The butterfly-type throttle valve as in claim 1, wherein each of the first split members is formed integrally with each of the second split members.

8. A throttle valve comprising:
a passage member constructed to define an intake air passage for an intake air of an internal combustion engine:
a valve shaft rotatably supported on the passage member and extending across the intake air passage;
a valve body comprising a plurality of first members jointly defining an axial bore for receiving the valve shaft;
a first coupling device constructed to couple the first members together; and
a closing member constructed to close a gap produced between the valve body and a wall surface of the intake air passage when the valve body is in a fully closed position;
wherein:
the valve body further includes a plurality of second members jointly defining a groove for receiving the closing member; and
the throttle valve further includes a second coupling device constructed to couple the second members together.

9. The throttle valve as in claim 8, wherein:
each of the first members is made of resin; and
the first coupling device comprises at least one of welding means, adhesive means, heating and crimping means, press-fitting means and snap fit means.

10. The throttle valve as in claim 8, wherein each of the second members is made of resin.

11. The throttle valve as in claim 8, wherein each of the second member is formed integrally with each of the first members.

12. The throttle valve as in claim 10, wherein the second coupling device comprises at least one of welding means, adhesive means, heating and crimping means, press-fitting means and snap-fit means.

13. The throttle valve as in claim 8, further comprising a positioning device constructed to position the first members relative to each other before the first members are coupled together.

14. A throttle valve comprising:
a passage member constructed to define an intake air passage for an intake air of and an internal combustion engine;
a valve shaft rotatably supported on the passage member and extending across the intake air passage;
a valve body fitted on the valve shaft, so that the valve body can rotate with the valve shaft; and
a closing member constructed to close a gap produced between the valve body and an wall surface of the passage member when the valve body is in a fully closed position; wherein the valve body includes a plurality of body members jointly defining an axial bore for receiving the valve shaft and a groove for receiving the closing member.

* * * * *